(12) United States Patent
Maor et al.

(10) Patent No.: US 12,386,033 B2
(45) Date of Patent: Aug. 12, 2025

(54) APPARATUS, SYSTEM AND METHOD OF RADAR ANTENNA CALIBRATION

(71) Applicant: INTEL CORPORATION, Santa Clara, CA (US)

(72) Inventors: Lior Maor, Petah Tikva (IL); Alon Cohen, Modi'in-Maccabim-Reut (IL); Moshe Teplitsky, Tel-Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 269 days.

(21) Appl. No.: 17/909,426

(22) PCT Filed: Dec. 24, 2020

(86) PCT No.: PCT/US2020/067022
§ 371 (c)(1),
(2) Date: Sep. 5, 2022

(87) PCT Pub. No.: WO2021/206769
PCT Pub. Date: Oct. 14, 2021

(65) Prior Publication Data
US 2023/0126991 A1    Apr. 27, 2023

Related U.S. Application Data

(60) Provisional application No. 63/005,773, filed on Apr. 6, 2020.

(51) Int. Cl.
*G01S 7/40* (2006.01)
*G01S 7/288* (2006.01)
*G01S 13/02* (2006.01)

(52) U.S. Cl.
CPC ............... *G01S 7/40* (2013.01); *G01S 7/288* (2013.01); *G01S 13/02* (2013.01)

(58) Field of Classification Search
None
See application file for complete search history.

(56) References Cited

U.S. PATENT DOCUMENTS

2015/0070207 A1    3/2015  Millar et al.
2017/0045609 A1    2/2017  Loesch
(Continued)

FOREIGN PATENT DOCUMENTS

EP         3048300 A1    7/2016
JP       2008-124595     5/2008
(Continued)

OTHER PUBLICATIONS

Search Report for European Patent Application No. 20929942.9, mailed on Mar. 20, 2024, 36 pages.
(Continued)

*Primary Examiner* — Whitney Moore
(74) *Attorney, Agent, or Firm* — Shichrur & Co.

(57) ABSTRACT

For example, a radar apparatus may include an input to receive radar receive (Rx) data, the radar Rx data based on radar signals received via a plurality of Rx antennas of Multiple-Input-Multiple-Output (MIMO) radar antenna; and a radar processor configured to generate radar information based on the radar Rx data by calibrating an antenna Mismatch (MM) of the MIMO radar antenna such that the radar information includes an Angle of Arrival (AoA) spectrum having a Peak Side Lobe Level (PSLL) of at least 30 decibel (dB).

22 Claims, 15 Drawing Sheets

(56) References Cited

U.S. PATENT DOCUMENTS

| | | | |
|---|---|---|---|
| 2018/0210070 A1 | 7/2018 | Bleyer et al. | |
| 2018/0306902 A1 | 10/2018 | Pernstal et al. | |
| 2019/0025403 A1 | 1/2019 | Hoffman et al. | |
| 2019/0353751 A1 | 11/2019 | Raphaeli et al. | |
| 2020/0033445 A1 | 1/2020 | Raphaeli et al. | |
| 2020/0355789 A1 | 11/2020 | Kitamura | |

FOREIGN PATENT DOCUMENTS

| | | |
|---|---|---|
| JP | 2015-117974 | 6/2015 |
| JP | 2017-112570 | 6/2017 |
| JP | 2019-128235 | 8/2019 |

OTHER PUBLICATIONS

Tan Weixian et al: "Array error calibration methods in downward-looking linear-array three-dimensional synthetic aperture radar", Journal of Applied Remote Sensing, Society of Photo-Optical Instrumentation Engineers, 1000 20th St. Bellingham WA 98225-6705 USA, vol. 10, No. 2, Apr. 1, 2016 (Apr. 1, 2016), p. 25010, XP060071615, DOI: 10.1117/1.JRS.10.025010 [retrieved on May 2, 2016], 21 Pages.

Yu Jason et al: "Adaptive phase-array calibration using MIMO radar clutter", 2013 IEEE Radar Conference (RadarCon13), IEEE, Apr. 29, 2013 (Apr. 29, 2013), pp. 1-5, XP032479573, ISSN: 1097-5659, DOI: 10.1109/RADAR.2013.6586120 ISBN: 978-1-4673-5792-0 [retrieved on Aug. 23, 2013].

C.M.S. See (Defence Science Organisation, 20, Science Park Drive, Singapore 0511. Republic of Singapore), "Sensor array calibration in the presence of mutual coupling and unknown sensor gains and phases", Electronics Letters, Mar. 3, 1994, vol. 30, No. 5, pp. 373-374.

Schmid et al., "An FMCW MIMO Radar Calibration and Mutual Coupling Compensation Approach", Proceedings of the 10th European Radar Conference, Oct. 9-11, 2013, Nuremberg, Germany, pp. 13-16.

International Search Report and the Written Opinion for International Application No. PCT/US2020/067022, mailed on Apr. 26, 2021, 8 pages.

Office Action for Indian Patent Application No. 202247050625, mailed on Mar. 15, 2024, 7 pages.

Office Action for Japanese Patent Application No. 2022-552576, mailed on Jul. 2, 2024, 2 pages.

International Preliminary Report on Patentability for International Application No. PCT/US2020/067022, mailed on Oct. 20, 2022, 5 pages.

APPARATUS, SYSTEM AND METHOD OF RADAR ANTENNA CALIBRATION

CROSS REFERENCE

This application claims the benefit of, and priority from, U.S. Provisional Patent Application No. 63/005,773 entitled "APPARATUS, SYSTEM AND METHOD OF RADAR ANTENNA CALIBRATION", filed Apr. 6, 2020, the entire disclosure of which is incorporated herein by reference.

TECHNICAL FIELD

Aspects described herein generally relate to radar antenna calibration.

BACKGROUND

Multiple Input Multiple Output (MIMO) radar is a technology that allows reduction of a physical array aperture and a number of antenna elements by transmission of orthogonal signals from a transmit (Tx) array with a plurality of elements, and processing received signals via a receive (Rx) array with a plurality of elements.

As antennas are manufactured with some enhanced phase and gain as their ground state, an antenna array may be dysfunctional without a proper calibration of antenna elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
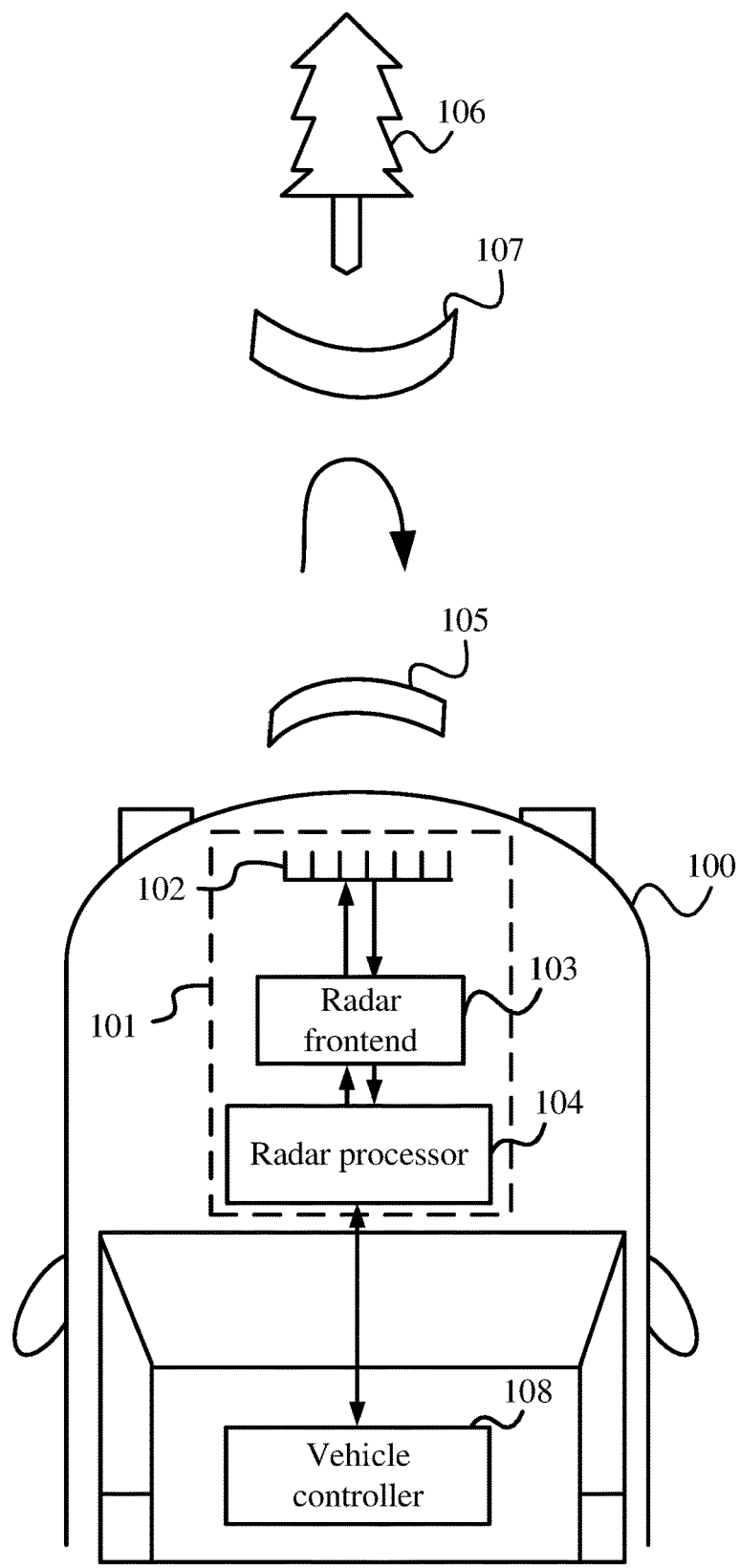
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory.

The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 101 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below. In one example, radar device 101 may be mounted onto, placed, e.g., directly, onto, or attached to, vehicle 100.

In some demonstrative aspects, vehicle 100 may include a single radar device 101. In other aspects, vehicle 100 may include a plurality of radar devices 101, for example, at a plurality of locations, e.g., around vehicle 100.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic.

Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identify a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
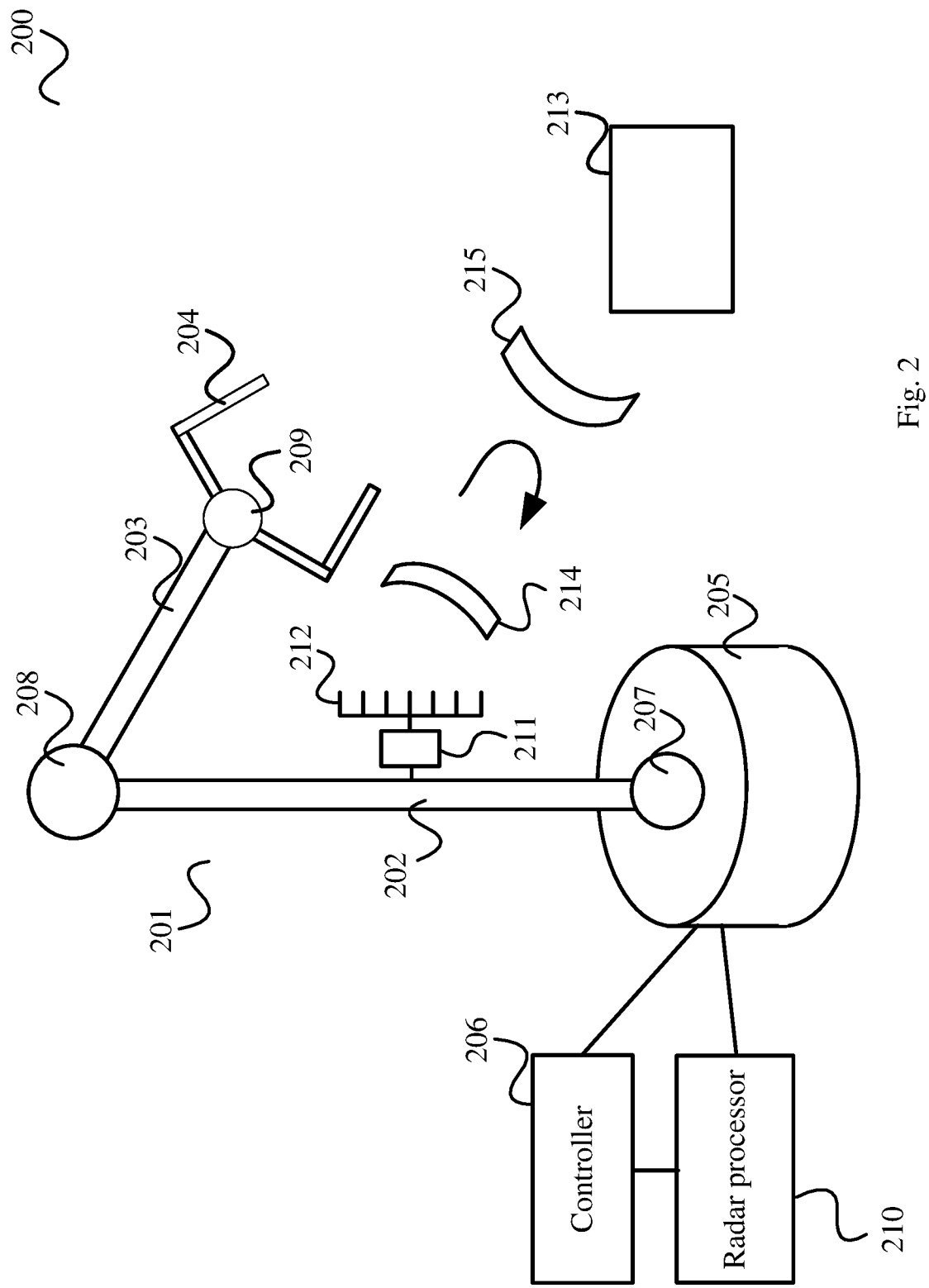
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
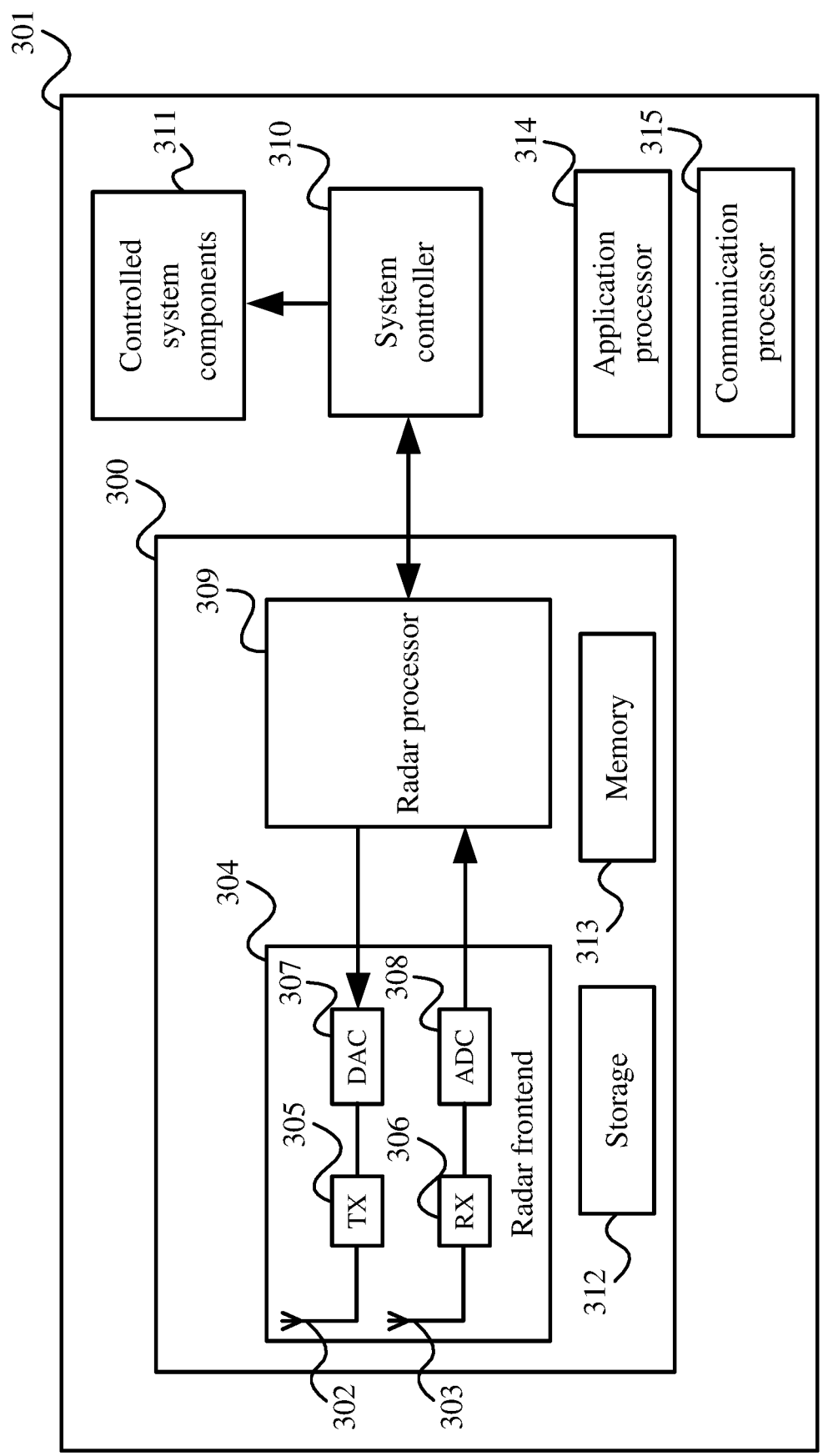
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital (ADC) Converter 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
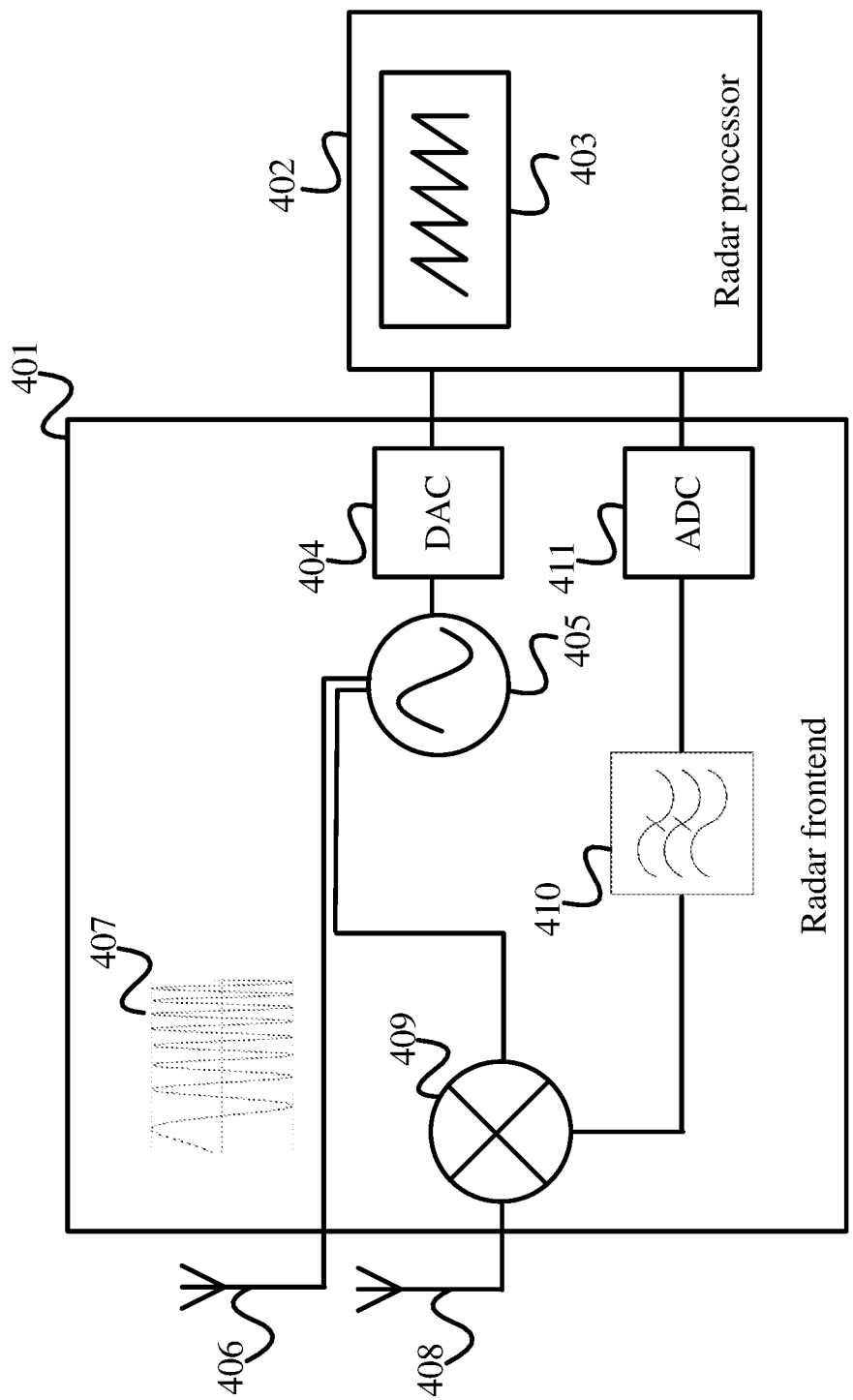
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radio frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radio frontend 401 may include a mixer 409 to mix the radio transmit signal with the radio receive signal into a mixed signal.

In some demonstrative aspects, radio frontend 401 may include a filter, e.g., a Low Pass Filter (LPF) 410, which may be configured to filter the mixed signal from the mixer 409 to provide a filtered signal. For example, radio frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
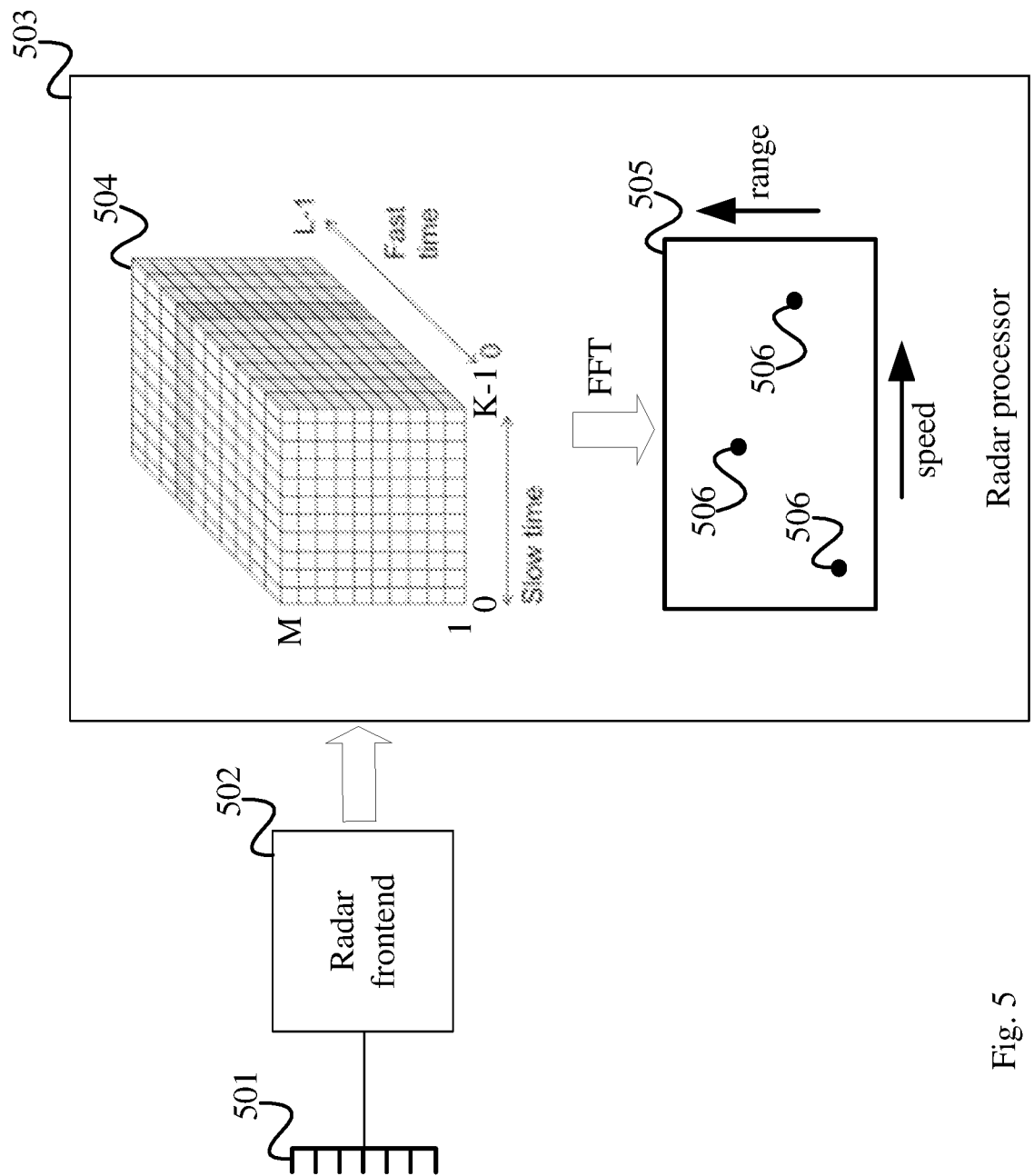
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 105 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
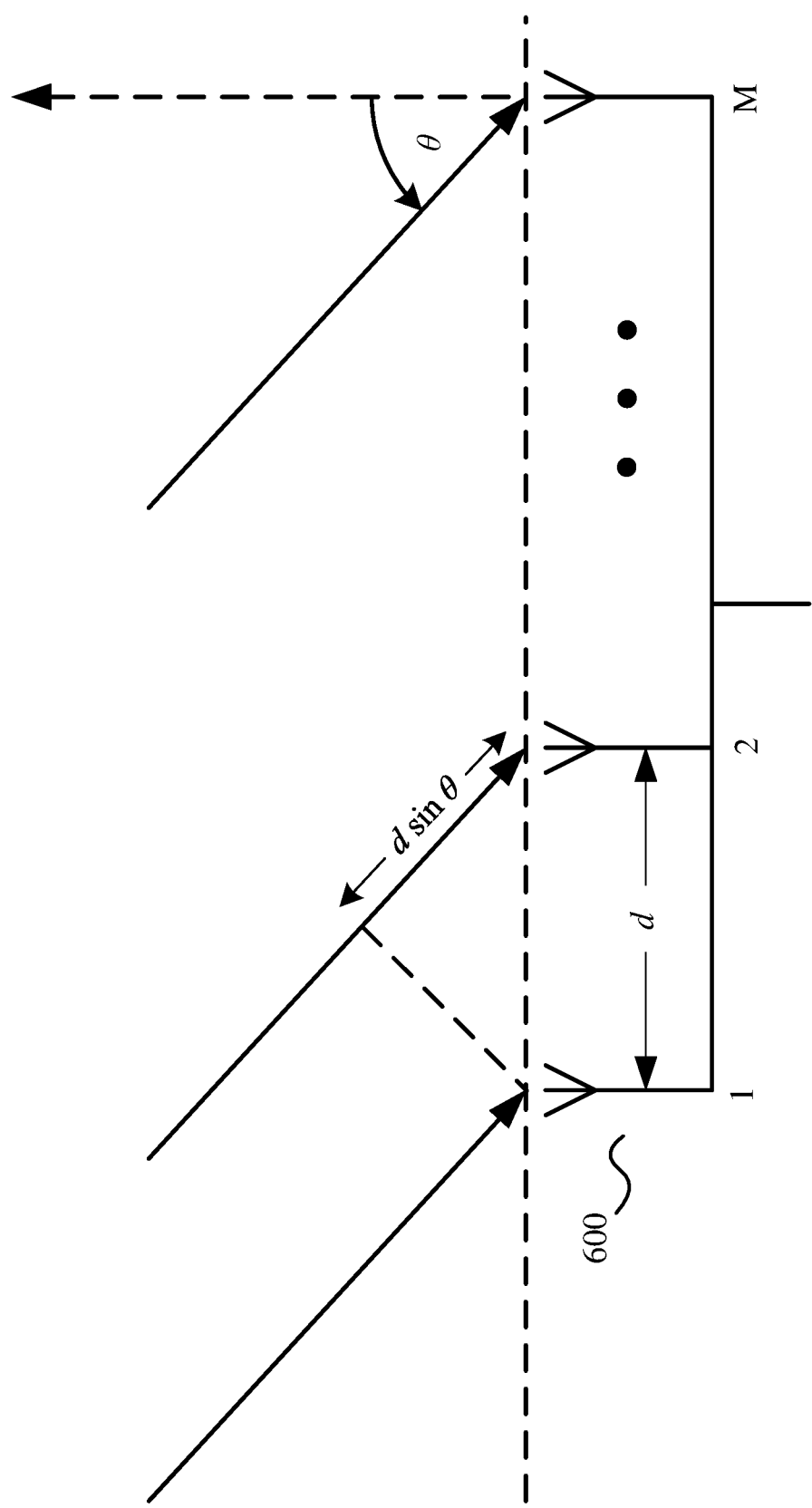
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 601 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
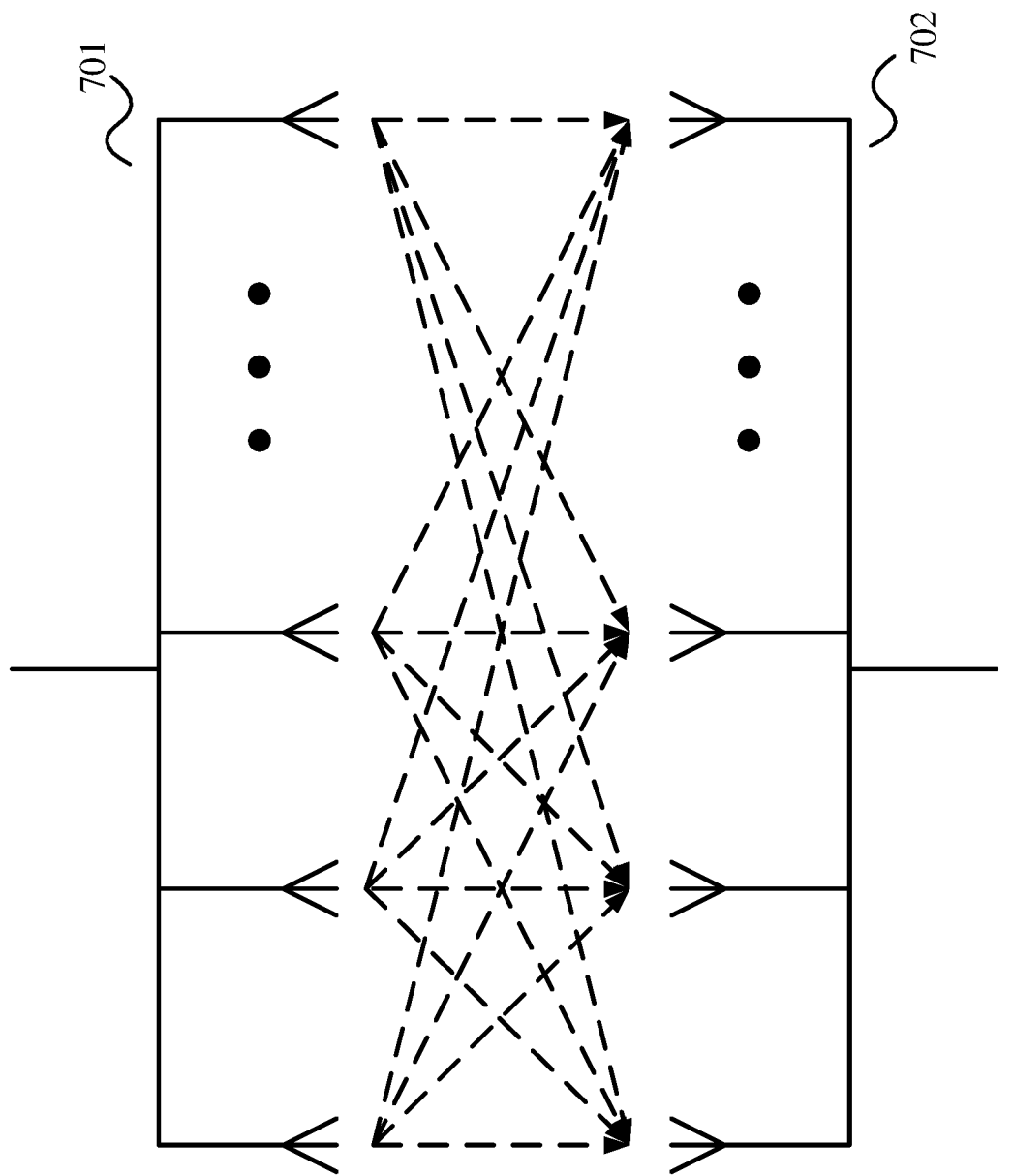
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
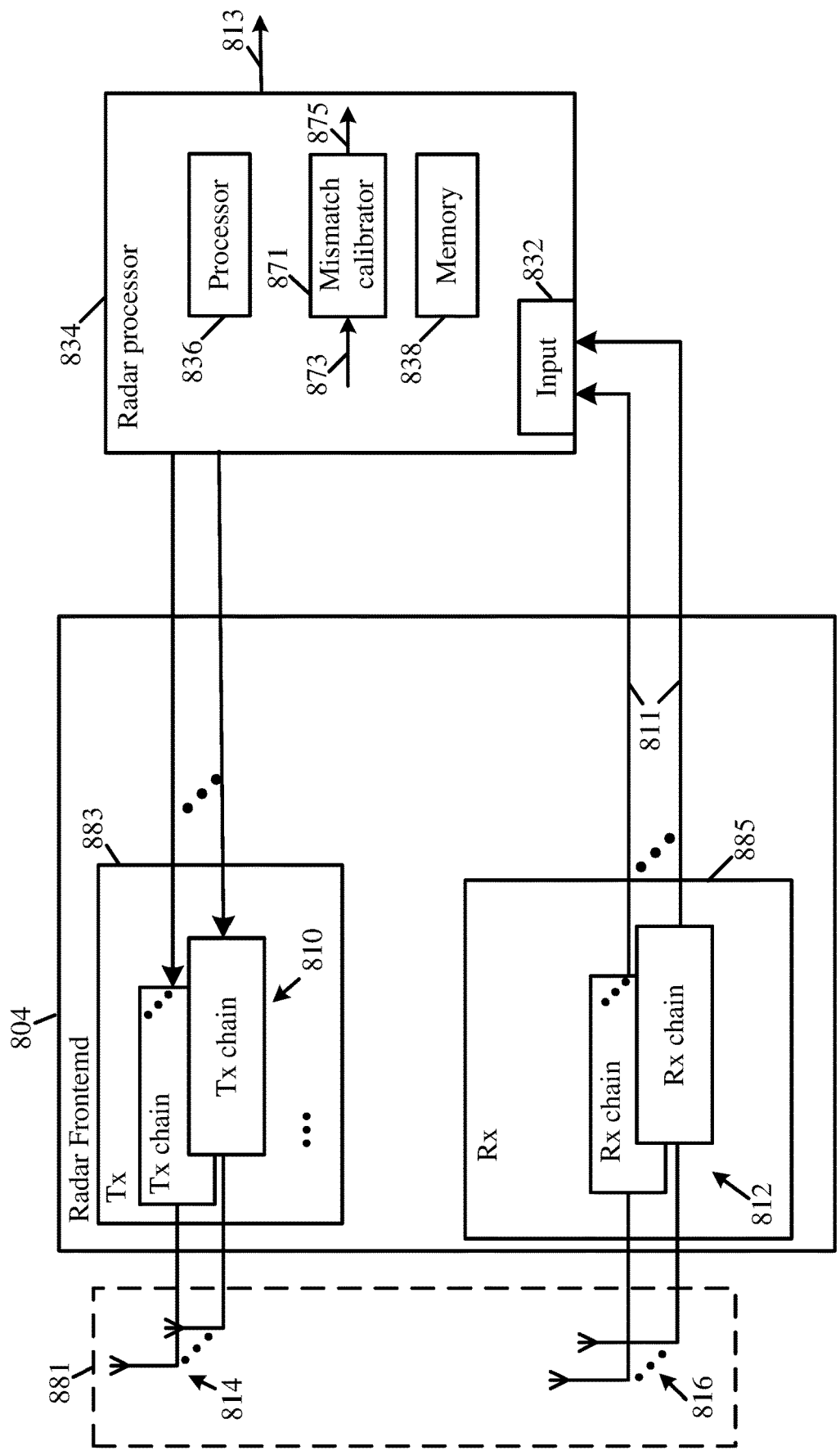
FIG. 8 is a schematic block diagram illustration of a radar frontend and a radar processor, in accordance with some demonstrative aspects.

FIG. 8 is a schematic block diagram illustration of a radar frontend 804 and a radar processor 834, in accordance with some demonstrative aspects. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 1), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the Rx RF signals received via the Rx antennas 816.

In some demonstrative aspects, radar processor 834 may include an input 832 to receive the radar Rx data 811 from the plurality of Rx chains 812.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar RX data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via a Tx array including a plurality of N elements, e.g., Tx antennas 814, and processing received signals via an Rx array including a plurality of M elements, e.g., Rx antennas 816.

In some demonstrative aspects, utilizing the MIMO technique of transmission of the orthogonal signals from the Tx array with N elements and processing the received signals in the Rx array with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, there may be a need to provide a technical solution to efficiently and/or accurately calibrate an antenna array. For example, antennas may be manufactured with some enhanced phase and gain as their ground state, and, accordingly, an antenna array may be dysfunctional, for example, if the antenna elements of the array are not calibrated.

In some demonstrative aspects, calibrating an antenna array by placing a target at known location and with the expected gain and phase upon each antenna may have one or more technical inefficiencies, disadvantages and/or problems in one or more use cases and/or scenarios. For example, a single target may not be enough to calibrate the antennas, since an antenna pattern is non-isotropic. Accordingly, multiple antennas at various locations may be required to calibrate the whole antenna array. Such a solution may be expensive in terms of time and cost.

Some demonstrative aspects may be configured to provide a technical solution to support calibrating an antenna array at multiple instances, for example, at one or more defined instances, in a dynamic manner, and/or in real-time, for example, post installation and/or during operation of radar frontend 804. In one example, radar processor 834 may be configured to support calibration of MIMO antenna array 881, for example, upon or after installation of one or more antenna elements of MIMO antenna array 881, and/or at one or more later times, for example, after treatment of one or more antenna elements in antenna array 881 and/or after treatment to surroundings of the MIMO antenna array 881. In one example, if MIMO antenna array 881 is placed behind a car bumper, then calibration may be performed based on installment, treatment and/or change in the car bumper, e.g., after an accident, for example, since the car bumper may add some mismatch to the calibration of the MIMO antenna array 881.

In some demonstrative aspects, radar processor 834 may be configured to perform a mismatch calibration to calibrate a mismatch of MIMO antenna array 881, for example, to improve performance of the antenna array 881, e.g., as described below.

In some demonstrative aspects, radar processor 834 may be configured to perform the mismatch calibration, for example, to provide a technical solution, which may even avoid factory calibrations and/or use of special hardware.

In some demonstrative aspects, there may be a need to provide a technical solution to efficiently and/or accurately calibrate an antenna array mismatch (MM) of an antenna array, for example, by calibrating at least one of a Gain MM (GMM), a Phase MM (PMM), and/or a Cross Coupling (CC) between elements of the antenna array.

In some demonstrative aspects, there may be a need to provide a technical solution to achieve a sufficient Peak Side Lobe Level (PSLL) of an estimated AoA spectrum, which may be a Key Performance Indicator (KPI) for radar systems.

In some demonstrative aspects, the PSLL of an AoA spectrum may be determined as a difference between a power level (e.g., in decibel (dB)) of a main-lobe in the AoA spectrum, and a power level (e.g., in dB) of a peak, e.g., maximal, side-lobe corresponding to the main-lobe. For example, according to this PSLL determination, a higher PSLL may be considered better than a lower PSLL.

In some demonstrative aspects, for example, when the main-lobe has a power level of 0 dB, then the PSLL may be determined as a positive value according to the power level of the peak side-lobe corresponding to the main-lobe.

In other aspects, the PSLL of an AoA spectrum may be determined as a difference between a power level (e.g., in dB) of a peak, e.g., maximal, side-lobe corresponding to a main-lobe, and a power level (e.g., in dB) of the main-lobe in the AoA spectrum. For example, according to this PSLL definition, the PSLL may include a negative value. For example, according to this PSLL definition, a lower PSLL may be considered better than a higher PSLL.

In some demonstrative aspects, the PSLL may be affected by the antenna array mismatch. For example, in order to achieve a sufficient, e.g., improved, PSLL level, there may be a need to reduce an antenna mismatch, for example, a reduced GMM, e.g., less than ~0.05 dB in gain variation, and/or a reduced PMM, e.g., less than ~0.25 deg in angle variation.

In one example, a first PSLL level of 60 dB, and a second PSLL level of 45 dB, may be achieved, for example, based on the following mismatch levels:

TABLE 1

| Required PSLL [dB] | TX GMM [dB] | TX PMM [Deg] | RX GMM [dB] | RX PMM [Deg] |
|---|---|---|---|---|
| 60 | 0.05 | 0.25 | 0.05 | 0.25 |
| 45 | 0.3 | 3 | 0.3 | 3 |

For example, according to Table 1, there may be a need to reduce the mismatch parameters, e.g., even less than ~0.5 dB, for example, in order to achieve improved PSLL levels of at least 30 dB, e.g., 45 dB or 60 dB.

In another example, any other combination of MM parameters may be implemented.

In some demonstrative aspects, implementing an antenna array without antenna MM calibration, may result in PSLL levels which may result in one or more technical inefficiencies, disadvantages and/or problems in one or more use cases and/or scenarios, e.g., as described below.

Figure 9:
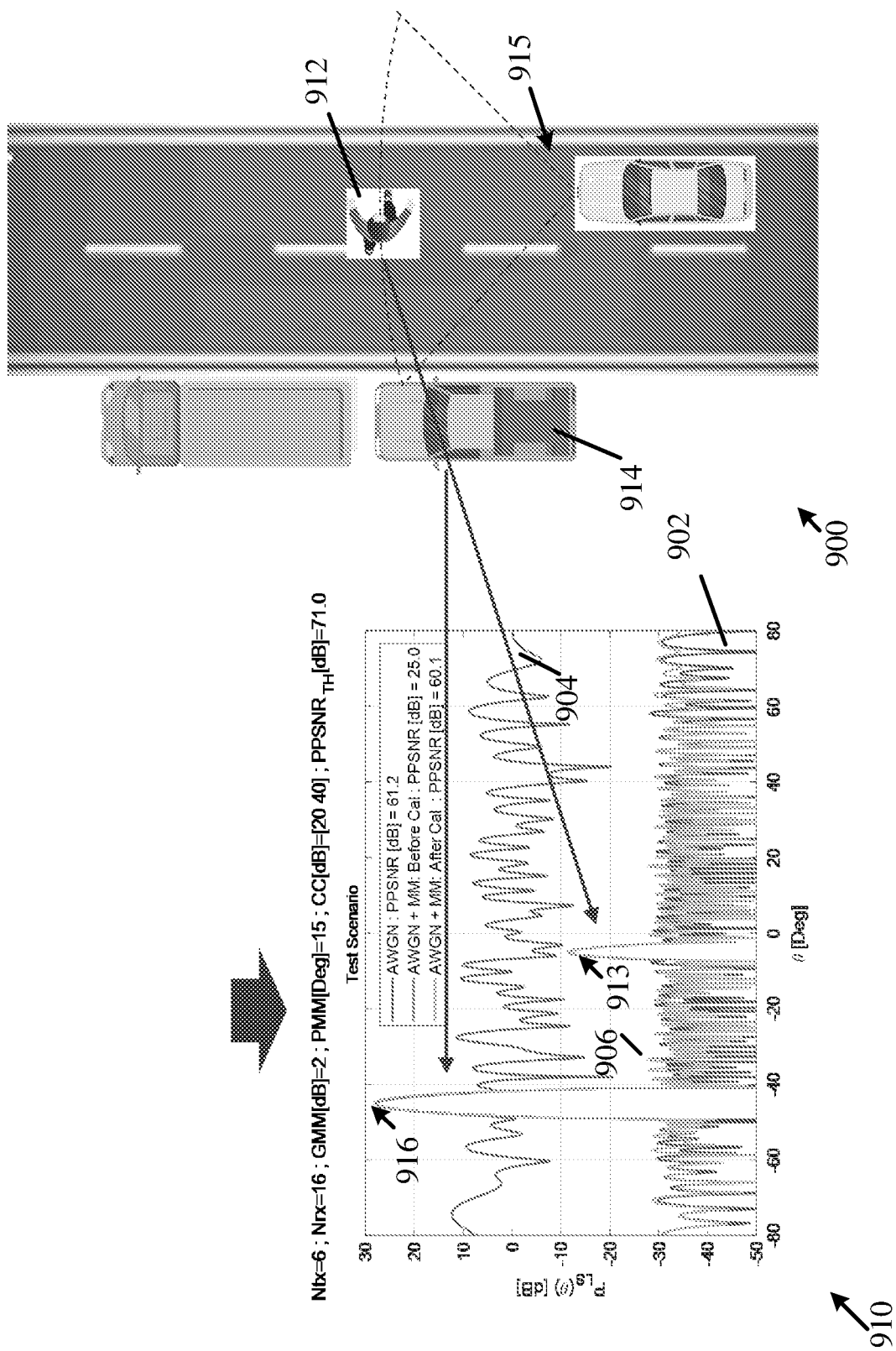
FIG. 9 is a schematic illustration of a radar detection scenario, and a graph depicting a plurality of AoA spectrum images corresponding to the radar detection scenario, to demonstrate a technical problem, which may be addressed in accordance with some demonstrative aspects.

Reference is made to FIG. 9, which schematically illustrates a detection scenario 900, and a graph 910 depicting a plurality of AoA spectrum images corresponding to the radar detection scenario 900, to demonstrate a technical problem, which may be addressed in accordance with some demonstrative aspects.

A shown in FIG. 9, detection scenario 900 shows a human 912 crossing a road or just standing on the road, and a parked car 914, which may be detected by a vehicular radar 915.

According to the detection scenario 900, the human 912 and the car 914 may be detected by the vehicular radar 915 as being in a same Range-Doppler (RD) bin, e.g., the human 912 and the car 914 may be detected by the vehicular radar 915 to be at about the same range and velocity.

For example, according to the detection scenario 900, there may be a need to be able to differentiate between the human 912 and the car 914, for example, by detecting a different AoA for the human 912 and the car 914, for example, as estimated by vehicular radar 915.

In some demonstrative aspects, as shown in FIG. 9, an AoA spectrum image 902 may be based on Rx radar signals received by a MIMO antenna array which does not have antenna mismatch.

In some demonstrative aspects, as shown in FIG. 9, an AoA spectrum image 904 may be based on Rx radar signals received by a MIMO antenna array having an antenna mismatch, and without performing any antenna mismatch calibration.

In some demonstrative aspects, as shown in FIG. 9, the antenna mismatch may result in a "corrupted" AoA spectrum image 904, having an increased noise level, for example, e.g., compared to the AoA image 902 without mismatch.

In some demonstrative aspects, as shown in FIG. 9, an AoA spectrum image 906 may be determined based on the Rx radar signals received by the MIMO antenna array with the antenna mismatch, when applying an antenna MM calibration, e.g., as described below.

In some demonstrative aspects, as shown in FIG. 9, the AoA spectrum image 906 of the MIMO antenna array with the antenna mismatch calibration may be relatively similar to the AoA spectrum image 902 of the antenna array without the antenna mismatch.

In some demonstrative aspects, according to the example of FIG. 9, as shown by the AoA spectrum image 902, a Radar Cross Section (RCS) 216 corresponding to the car 914 may be about 40 dB higher than an RCS 913 corresponding to human 912. According to this example, there may be a need to achieve a PSLL level of about 55 dB with respect to the RCS of the car 916, for example, in order to allow detecting the human RCS 913, e.g., assuming a Post Processing Signal To Noise Ratio SNR (PPSNR) for detection is about ~15 dB.

For example, as shown in FIG. 9, the AoA spectrum image 904 may have a PSLL level of less than 20 dB, e.g., as may be determined based on the difference between the power level of the main-lobe, e.g., about 28 dB, and the power level of the peak side-lobe corresponding to the main-lobe, e.g., about 10 dB.

In some demonstrative aspects, as shown in FIG. 9, the AoA spectrum image 904 may suffer from an increased noise level, which may not allow to differentiate between the RCS 913 corresponding to human 912 and the RCS 916 corresponding to the car 914.

In some demonstrative aspects, as shown in FIG. 9, the AoA spectrum image 906 may have a PSLL level of about 58 dB, e.g., as may be determined based on the difference between the power level of the main-lobe, e.g., about 28 dB, and the power level of the peak side-lobe corresponding to the main-lobe, e.g., about −30 dB.

In some demonstrative aspects, as shown in FIG. 9, the AoA spectrum image 906 may allow to differentiate between the RCS 913 corresponding to human 912, and the RCS 916 corresponding to the car 914.

For example, the PSLL of about 58 dB of AoA spectrum image 906 may be sufficient to allow differentiating between the AoA of the human 912 and the AoA of the car 914.

Referring back to FIG. 8, in some demonstrative aspects, radar processor 834 may be configured to generate radar information 813, for example, based on radar Rx data 811 and a mismatch calibration, e.g., as described below. For example, radar processor 834 may receive the radar Rx data 811 vie input 832, for example, from the Rx chains 812. For example, radar Rx data 811 may be based on radar signals received via Rx antennas 816.

In some demonstrative aspects, radar processor 834 may be configured to generate radar information 833 including AoA information, for example, azimuth AoA information, elevation AoA information, and/or any other AoA-based information.

In some demonstrative aspects, radar processor 834 may be configured to generate radar information 833 including an AoA spectrum, e.g., an azimuth AoA spectrum an elevation AoA spectrum, and/or any other AoA-based spectrum.

In some demonstrative aspects, radar processor 834 may be configured to perform a mismatch calibration to calibrate a mismatch of MIMO antenna array 881, for example, to improve performance of the antenna array 881, for example, to achieve a PSLL of at least 30 dB, e.g., as described below.

In some demonstrative aspects, radar processor 834 may be configured to perform the mismatch calibration, for example, to provide a technical solution, which may allow to calibrate a mismatch of antenna array 881, for example, while utilizing a computationally efficient calibration technique, and/or in a manner which may support a reduced calibration time, e.g., as described below.

In some demonstrative aspects, radar processor 834 may be configured to perform the mismatch calibration of MIMO antenna array 881, for example, according to a calibration technique, which may be performed within a relatively short time period, e.g., even within a few minutes.

In some demonstrative aspects, radar processor 834 may be configured to perform the mismatch calibration of MIMO antenna array 881, for example, according to a calibration technique, which may be performed in real-time, and/or according to a suitable timing scheme, for example, to dynamically calibrate the mismatch calibration of MIMO antenna array 881.

In some demonstrative aspects, radar processor 834 may be configured to generate radar information 813 based on the radar Rx data 811, for example, by calibrating an antenna Mismatch (MM) of the MIMO radar antenna 881, for example, such that the radar information 813 includes an AoA spectrum having a PSLL of at least 30 dB, e.g., as described below.

For example, the PSLL may be defined and/or determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 35 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 40 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 45 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 50 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having a PSLL of at least 55 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 113 including the AoA spectrum having a PSLL of at least 60 dB, for example, wherein the PSLL is determined as a difference between a power level of a main-lobe of the AoA spectrum and a power level of a peak side-lobe corresponding to the main-lobe in the AoA spectrum, e.g., as described below.

In some demonstrative aspects, radar processor 834 may be configured to generate radar information 813 including the AoA spectrum having any other suitable PSLL level.

In some demonstrative aspects, memory 838 may be configured to store a first calibration matrix and a second calibration matrix, e.g., as described below.

In some demonstrative aspects, as shown in FIG. 8, memory 838 may be implemented as part of radar processor 834. In other aspects, memory 838 may be implemented as a dedicated memory and/or as part of any other element of radar frontend 804, and/or any other device or system implementing radar frontend 804 and/or radar processor 834, e.g., vehicle 100 (FIG. 1).

In some demonstrative aspects, radar processor 836 may be configured to retrieve the first calibration matrix and the second calibration matrix from the memory 838, and to generate the radar information 813 by calibrating the antenna MM of the MIMO radar antenna 881 based on the first calibration matrix and the second calibration matrix, e.g., as described below.

In some demonstrative aspects, the first calibration matrix may include an Rx calibration matrix, and/or the second calibration matrix may include a Tx calibration matrix, e.g., as described below.

In some demonstrative aspects, the Rx calibration matrix may correspond to an Rx MM of the plurality of Rx antennas 816; and/or the Tx calibration matrix may correspond to a Tx MM of the plurality of Tx antennas 814, of the MIMO radar antenna 881, e.g., as described below.

In some demonstrative aspects, the first calibration matrix may have a size of M*M, and/or the second calibration matrix may have a size of N*N, wherein M denotes a count of the Rx antennas 816, and N denotes a count of the Tx antennas 814, e.g., as described below.

In some demonstrative aspects, radar processor 834 may be configured to update at least one of the first calibration matrix and/or the second calibration matrix, for example, based on a change in at least one parameter affecting the antenna MM of the MIMO radar antenna 881, e.g., as described below.

In some demonstrative aspects, radar processor 834 may be configured to dynamically update, e.g., in real-time or with shot latency, at least one of the first calibration matrix and/or the second calibration matrix, for example, based on a detected change in at least one parameter affecting the antenna MM of the MIMO radar antenna, e.g., as described below.

In some demonstrative aspects, radar processor 834 may be configured to dynamically update, e.g., in real-time or with shot latency, at least one of the first calibration matrix and/or the second calibration matrix, and to perform the mismatch calibration of MIMO antenna array 881 based on the updated first calibration matrix and/or second calibration matrix, e.g., as described below.

In some demonstrative aspects, radar processor 834 may be configured to dynamically update, e.g., in real-time or with shot latency, at least one of the first calibration matrix and/or the second calibration matrix, and/or perform the mismatch calibration of MIMO antenna array 881, for example, at one or more time points.

In some demonstrative aspects, radar processor 834 may be configured to automatically and/or autonomously update, e.g., in real-time or with shot latency, at least one of the first calibration matrix and/or the second calibration matrix, and/or perform the mismatch calibration of MIMO antenna array 881, for example, according to a timing scheme, for example, once a day, once a week, once a month, and/or at any other time interval.

In some demonstrative aspects, radar processor 834 may be configured to dynamically update, e.g., in real-time or with shot latency, at least one of the first calibration matrix and/or the second calibration matrix, and/or perform the mismatch calibration of MIMO antenna array 881, for example, based on one or more events and/or criteria.

In on example, radar processor 834 may be configured to dynamically update, e.g., in real-time or with shot latency, at least one of the first calibration matrix and/or the second calibration matrix, and/or perform the mismatch calibration of MIMO antenna array 881, for example, based on installation and/or treatment of one or more elements of MIMO antenna array 881, e.g., after installation of antenna array 881, e.g., on vehicle 100 (FIG. 1), and/or upon a treatment, replacement, and/or adjustment of one or more elements of MIMO antenna array 881.

In on example, radar processor 834 may be configured to dynamically update, e.g., in real-time or with shot latency, at least one of the first calibration matrix and/or the second calibration matrix, and/or perform the mismatch calibration of MIMO antenna array 881, for example, based on installation and/or treatment of one or more other elements, which may have an effect on antenna array 881, for example, a new calibration of the antenna array, e.g., Tx antennas 814 and Rx antennas 816, after treatment to vehicle 100 (FIG. 1), for example, switching of a bumper of vehicle 100 (FIG. 1), and/or any other treatment, maintenance, or service.

In some demonstrative aspects, configuring radar processor 834 to perform the mismatch calibration of MIMO antenna array 881, e.g., as described herein, may provide a technical solution which may mitigate, reduce, and/or even avoid, errors in the radar information, which may be caused by changes in one or more elements of radar frontend 804 and/or vehicle 100 (FIG. 1), e.g., including aging, temperature changes, car accidents, radar movements and/or installation, and the like.

In some demonstrative aspects, radar processor 836 may be configured to generate intermediate radar information 873 based on the Rx radar signals, e.g., as described below.

In some demonstrative aspects, for example, the intermediate radar information 873 may include intermediate range-Doppler information based on the radar Rx data 811.

In some demonstrative aspects, radar processor 836 may be configured to generate the intermediate range-Doppler information by processing the radar Rx data 811, for example, according to a range-Doppler processing scheme.

For example, radar processor 836 may be configured to generate intermediate range information by applying range-based processing, e.g., cross correlation processing, to the radar Rx data 811.

For example, radar processor 836 may be configured to generate XCORR information based on the radar Rx data 811, and to generate the intermediate radar data 873, for example, by applying a Fast Fourier Transform (FFT) to the XCORR information.

For example, radar processor 836 may be configured to generate the intermediate range-Doppler information by applying Doppler-based processing, e.g., FFT processing, to the intermediate range information.

In other aspects, intermediate radar information 873 may include any other information, for example, partially processed radar information based on radar Rx data 811.

In some demonstrative aspects, radar processor 834 may include an antenna MM calibrator 871 configured to generate calibrated intermediate radar information 875 by applying an antenna MM calibration to the intermediate radar data 873, e.g., as described below.

In some demonstrative aspects, antenna mismatch calibrator 871 may be implemented as part of radar processor 834. In other aspects, antenna mismatch calibrator 832 and radar processor 834 may be implemented as separate and/or dedicated elements, e.g., processors, of radar frontend 804, and/or any other device or system implementing radar frontend 804 and/or radar processor 834, e.g., vehicle 100 (FIG. 1).

In some demonstrative aspects, radar processor 834 may be configured to generate the radar information 813 based on the calibrated intermediate radar information 875, e.g., as described below.

In some demonstrative aspects, radar processor 834 may be configured to generate the radar information 813 by applying to the calibrated intermediate radar information 875 one or more radar-processing operations, for example, AoA-based processing operations, and/or any other additional or alternative radar processing operations.

In some demonstrative aspects, antenna MM calibrator 871 may be configured to retrieve the first calibration matrix and/or the second calibration matrix from the memory 838, and to generate the calibrated intermediate radar information 875, for example, by applying the first calibration matrix and the second calibration matrix to the intermediate radar information 873, e.g., as described below.

In some demonstrative aspects, antenna MM calibrator 871 may be configured to determine a product of the first calibration matrix multiplied by the intermediate radar information 873, e.g., as described below.

In some demonstrative aspects, antenna MM calibrator 871 may be configured to determine the calibrated intermediate radar information 875, for example, by multiplying the product of the first calibration matrix and the intermediate radar information 873, for example, by the second calibration matrix, e.g., as described below.

In some demonstrative aspects, radar processor 836 and/or antenna MM calibrator 871 may be configured to calibrate the antenna MM of MIMO radar antenna 881 by implementing a MM calibration technique, e.g., as described below.

In some demonstrative aspects, the MM calibration technique may be configured to calibrate the antenna MM of MIMO radar antenna 881, for example, based on the first and second antenna calibration matrices, e.g., as described below.

In some demonstrative aspects, the MM calibration technique may be configured to calibrate the antenna MM of MIMO radar antenna 881, for example, based on the first and second antenna calibration matrices, which may be estimated based on measurements in a reduced number of calibration angels, for example, compared to other calibration methods.

In some demonstrative aspects, the MM calibration technique may be configured to calibrate the antenna MM of MIMO radar antenna 881, for example, using a number of calibration angels, which is based on an order of the number of Tx antennas 814, and/or an order of the number of Rx antennas 816, e.g., as described below.

In some demonstrative aspects, the MM calibration technique may be configured to calibrate the antenna MM of MIMO radar antenna 881, for example, based on the first and second antenna calibration matrices, which may be estimated using a number of calibration angels, which is in an order of twice the number of Tx antennas 814 and/or the number of Rx antennas 816, e.g., as described below.

In some demonstrative aspects, the MM calibration technique may be configured to calibrate the antenna MM of MIMO radar antenna 881, for example, based on the first and second antenna calibration matrices, which may be estimated using less than 500 calibration angels, for example, with respect to a MIMO radar antenna 881 including a total of up to about 200 antenna elements.

In some demonstrative aspects, the MM calibration technique may be configured to calibrate the antenna MM of MIMO radar antenna 881, for example, based on the first and second antenna calibration matrices, which may be estimated using less than 150 calibration angels, for example, with respect to a MIMO radar antenna 881 including 16 Tx antennas 814 and 96 Rx antennas 816, which correspond to 1536 virtual elements of a virtual MIMO array.

In some demonstrative aspects, radar processor 836 and/or antenna MM calibrator 871 may be configured to calibrate the antenna MM of MIMO radar antenna 881, for example, by implementing the MM calibration technique using an algorithm, e.g., a computationally efficient algorithm, for example, an algorithm based on Alternating least Square (ALS), while using a reduced number of calibration angles, which may significantly reduce a production calibration time. For example, the mismatch calibration technique may use less than 150 calibration angles for the calibration of 1536 virtual elements, e.g., 16×96 virtual elements.

In other aspects, any other number of calibration angles, Tx antennas 814, and/or Rx antennas 816, may be utilized.

In some demonstrative aspects, a radar signal model may be defined to represent radar signals communicated between N Tx antennas, e.g., Tx antennas 114, and M Rx antennas, e.g., Rx antennas 116, as follows:

$$X = Q_r a_r(\theta) \beta(\theta) a_t^T(\theta) Q_t^T S + W \quad (1)$$

wherein S denotes transmitted orthogonal signals, for example, the signals transmitted by Tx antennas 114, e.g., $S \in N \times L$; X denotes observed measurements, for example, received signals, for example, the received signals at Rx antennas 116, e.g., $X \in M \times L$; $a_t(\theta)$ denotes a Tx steering vector corresponding to the N Tx antennas, e.g., $a_t(\theta) \in N \times 1$; $\beta(\theta)$ denotes a complex amplitude, e.g., $\beta(\theta) \in 1 \times 1$, for example, due to a target RCS, range and/or angle; $a_r(\theta)$ denotes an Rx steering vector corresponding to the M receive antennas, e.g., $a_r(\theta) \in M \times 1$; W denotes an Additive white Gaussian Noise (AWGN) affecting the transmission from the N Tx antennas to the M Rx antennas, e.g., $W \in M \times L$: $W_{ij} \sim CN(0, \sigma_W^2)$; $Q_t$ denotes a Tx array MM matrix corresponding to the N Tx antennas, e.g., $Q_t \in N \times N$; and $Q_r$ denotes an Rx array MM matrix corresponding to the M Rx antennas, e.g., $Q_r \in M \times M$.

In some demonstrative aspects, the Tx steering vector $a_t(\theta)$ and the Tx array MM matrix $Q_t$ may be combined and/or rewritten, and/or the Rx steering vector $a_r(\theta)$ and the Rx array MM matrix $Q_r$ may be combined and/or rewritten, e.g., as follows:

Rx: $\tilde{a}_r(\theta) = Q_r a_r(\theta)$ where $Q_r \in M \times M$ is the Rx MM matrix Tx: $\tilde{a}_t(\theta) = Q_t a_t(\theta)$ where $Q_t \in N \times N$ is the Tx MM matrix $$Q_r = \begin{bmatrix} q_{r_{11}} & q_{r_{12}} & q_{r_{13}} & \cdots & q_{r_{1M}} \\ q_{r_{21}} & q_{r_{22}} & q_{r_{23}} & \cdots & q_{r_{2M}} \\ \vdots & & \ddots & & \\ \vdots & & & \ddots & \\ q_{r_{M1}} & q_{r_{M2}} & q_{r_{M3}} & \cdots & q_{r_{MM}} \end{bmatrix} \quad (2)$$

$$Q_t = \begin{bmatrix} q_{t_{11}} & q_{t_{12}} & q_{t_{13}} & \cdots & q_{t_{1N}} \\ q_{t_{21}} & q_{t_{22}} & q_{t_{23}} & \cdots & q_{t_{2N}} \\ \vdots & & \ddots & & \\ \vdots & & & \ddots & \\ q_{t_{N1}} & q_{t_{N2}} & q_{t_{N3}} & \cdots & q_{t_{NN}} \end{bmatrix}$$

$$q_{ij} = \begin{cases} i = j, & GainPhaseMM \\ i \neq j, & CrossCoupling \end{cases}$$

$$q_{ij} = (1 + \rho)e^{j\phi}$$

where:

$$\rho \sim N(0, \sigma_\rho^2)$$

$$\phi \sim N(0, \sigma_\phi^2)$$

In some demonstrative aspects, radar processor 834 and/or antenna MM calibrator 871 may be configured to determine calibrated intermediate radar information 875, for example, by applying to intermediate radar information 873 a first mismatch calibration matrix, for example, an Rx MM calibration matrix, denoted $\hat{Q}_r^{-1}$, and a second mismatch calibration matrix, for example, a Tx MM calibration matrix, denoted $\hat{Q}_t^{-1}$, e.g., as described below.

In some demonstrative aspects, the Rx MM calibration matrix $\hat{Q}_r^{-1}$ may include an inverse of an estimated Rx MM matrix, denoted $\hat{Q}_r$, which may be determined as an estimate of the Rx array MM matrix $Q_r$, e.g., as described below.

In some demonstrative aspects, the Tx MM calibration matrix $\hat{Q}_t^{-1}$ may include an inverse of an estimated Tx MM matrix, denoted $\hat{Q}_t$, which may be determined as an estimate of the Tx array MM matrix $Q_t$, e.g., as described below.

In some demonstrative aspects, the estimated Rx MM matrix $\hat{Q}_r$ and the estimated Tx MM matrix $\hat{Q}_t$ may be estimated separately, e.g., as described below. This separate estimation may allow an efficient estimation, e.g., in terms of computational effort, calibration time and/or calibration accuracy. In other aspects, any other procedure may be implemented to estimate the estimated Rx MM matrix $\hat{Q}_r$, and/or the estimated Tx MM matrix $\hat{Q}_t$, separately or in combination.

In some demonstrative aspects, radar processor 834 and/or antenna MM calibrator 871 may be configured to determine calibrated intermediate radar information, denoted $Y_{corrected}$, e.g., calibrated intermediate radar information 875, for example, by applying the calibration matrices $\hat{Q}_r^{-1}$ and $\hat{Q}_t^{-1}$ to intermediate radar information, denoted $Y_{corrupted}$, e.g., intermediate radar information 873, as follows:

$$Y_{corrected} = \hat{Q}_r^{-1} Y_{corrupted} \hat{Q}_t^{-1} \quad (3)$$

In some demonstrative aspects, the Rx MM calibration matrix $\hat{Q}_r^{-1}$ and/or the Tx MM calibration matrix $\hat{Q}_t^{-1}$ may be estimated according to an estimation procedure, for example utilizing a plurality of calibration images, e.g., which may be measured at a plurality of calibration angles, e.g., as described below.

In some demonstrative aspects, the Rx MM calibration matrix $\hat{Q}_r^{-1}$ and/or the Tx MM calibration matrix $\hat{Q}_t^{-1}$ may be preconfigured and stored in memory 838, e.g., during a production and/or calibration procedure of radar frontend 804.

In some demonstrative aspects, radar processor 834 and/or antenna MM calibrator 871 may be configured to determine the Rx MM calibration matrix $\hat{Q}_r^{-1}$ and/or the Tx MM calibration matrix $\hat{Q}_t^{-1}$.

In some demonstrative aspects, radar processor 834 and/or antenna MM calibrator 871 may be configured to determine and/or update the Rx MM calibration matrix $\hat{Q}_r^{-1}$ and/or the Tx MM calibration matrix $\hat{Q}_t^{-1}$, for example, based on changes in one or more parameters, which may affect the antenna MM of MIMO radar antenna 881.

In one example, the changes in the one or more parameters, which may affect the antenna MM of MIMO radar antenna 881 may include, for example, changes in a configuration and/arrangement of one or more antenna elements of MIMO radar antenna 881, and/or changes in one or more elements of a vehicle, e.g., vehicle 100 (FIG. 1) on which the MIMO radar antenna 881 is installed, which may affect the functionality of MIMO radar antenna 881.

In some demonstrative aspects, radar processor 834 and/or antenna MM calibrator 871 may be configured to determine and/or update the Rx MM calibration matrix $\hat{Q}_r^{-1}$ and/or the Tx MM calibration matrix $\hat{Q}_t^{-1}$, for example, post production of radar frontend 804, and/or post installment of radar frontend 804 on vehicle 100 (FIG. 1).

In some demonstrative aspects, radar processor 834 and/or antenna MM calibrator 871 may be configured to dynamically update the Rx MM calibration matrix $\hat{Q}_r^{-1}$ and/or the Tx MM calibration matrix $\hat{Q}_t^{-1}$, for example, in real-time, e.g., based on detected changes in one or more parameters, which may affect the antenna MM of MIMO radar antenna 881.

In some demonstrative aspects, the estimated Rx MM matrix $\hat{Q}_r$ and/or the Tx MM calibration matrix $\hat{Q}_t$ may be determined, for example, based on an estimation procedure including one or more of the following operations:

Estimate radar information, denoted $Y_k$, e.g., range-Doppler information, from K calibration angles, e.g. as follows:

$$Y_k = Q_r a_r(\theta_k) a_t^T(\theta_k) Q_t^T + \tilde{W}_K = Q_r A(\theta_k) Q_t^T + \tilde{W}_K \quad (4)$$

Determine the estimated Rx MM matrix and the Rx MM calibration matrix $\hat{Q}_t$ based on the radar information $Y_k$, for example, using an ALS algorithm, e.g., as follows:
Initialize $Q_r = I$
Solve for $Q_t$:

$$1. \begin{bmatrix} Y_1 \\ \vdots \\ Y_k \end{bmatrix} = \begin{bmatrix} Q_r & & \\ & \ddots & \\ & & Q_r \end{bmatrix} \begin{bmatrix} A_1 \\ \vdots \\ A_k \end{bmatrix} Q_t^T + \begin{bmatrix} \tilde{W}_1 \\ \vdots \\ \tilde{W}_K \end{bmatrix}$$

$$2.\ \tilde{Y} = \tilde{Q}_r \tilde{A} Q_t^T + \tilde{W} \Rightarrow \tilde{Y} = H Q_t^T + \tilde{W}$$

$$3.\ \hat{Q}_t = \left[ (H^H H)^{-1} H^H \tilde{Y} \right]^T$$

Solve for $Q_r$:

$$1.\ [Y_1 \ \ldots \ Y_k] = Q_r [A_1 \ \ldots \ A_k] \begin{bmatrix} Q_t^T & & \\ & \ddots & \\ & & Q_t^T \end{bmatrix} + [\tilde{W}_1 \ \ldots \ \tilde{W}_K]$$

$$2.\ \tilde{Y} = \tilde{Q}_r \tilde{A} \tilde{Q}_t^T + \tilde{W} \Rightarrow \tilde{Y} = Q_r H + \tilde{W}$$

$$3.\ \hat{Q}_r = \tilde{Y} H^H (H H^H)^{-1}$$

Repeat solving for $Q_t$ and for $Q_r$ until convergence.

In some demonstrative aspects, a cost function may be defined based on a Normalized Root Mean Square Error (NRMSE), e.g., as follows:

$$Cost = NRMSE = \frac{\|\hat{Q}_r - Q_r\|_F}{\|Q_r\|_F} + \frac{\|\hat{Q}_t - Q_t\|_F}{\|Q_t\|_F} \quad (5)$$

In some demonstrative aspects, a stopping Criteria for an n-th iteration of the estimation procedure may be defined, for example, based on the cost function, e.g., as follows:

$$\frac{\|\hat{Q}_{r,n} - \hat{Q}_{r,n-1}\|_F}{\|\hat{Q}_{r,n-1}\|_F} + \frac{\|\hat{Q}_{t,n} - \hat{Q}_{t,n-1}\|_F}{\|\hat{Q}_{t,n-1}\|_F} < 10^{-5} \quad (6)$$

In other aspects, any other cost function and/or stopping criteria may be utilized.

In other aspects, any other additional or alternative operations and/or procedures may be implemented to determine the estimated Rx MM matrix $\hat{Q}_r$ and/or the Tx MM calibration matrix $\hat{Q}_t$.

Figure 10:
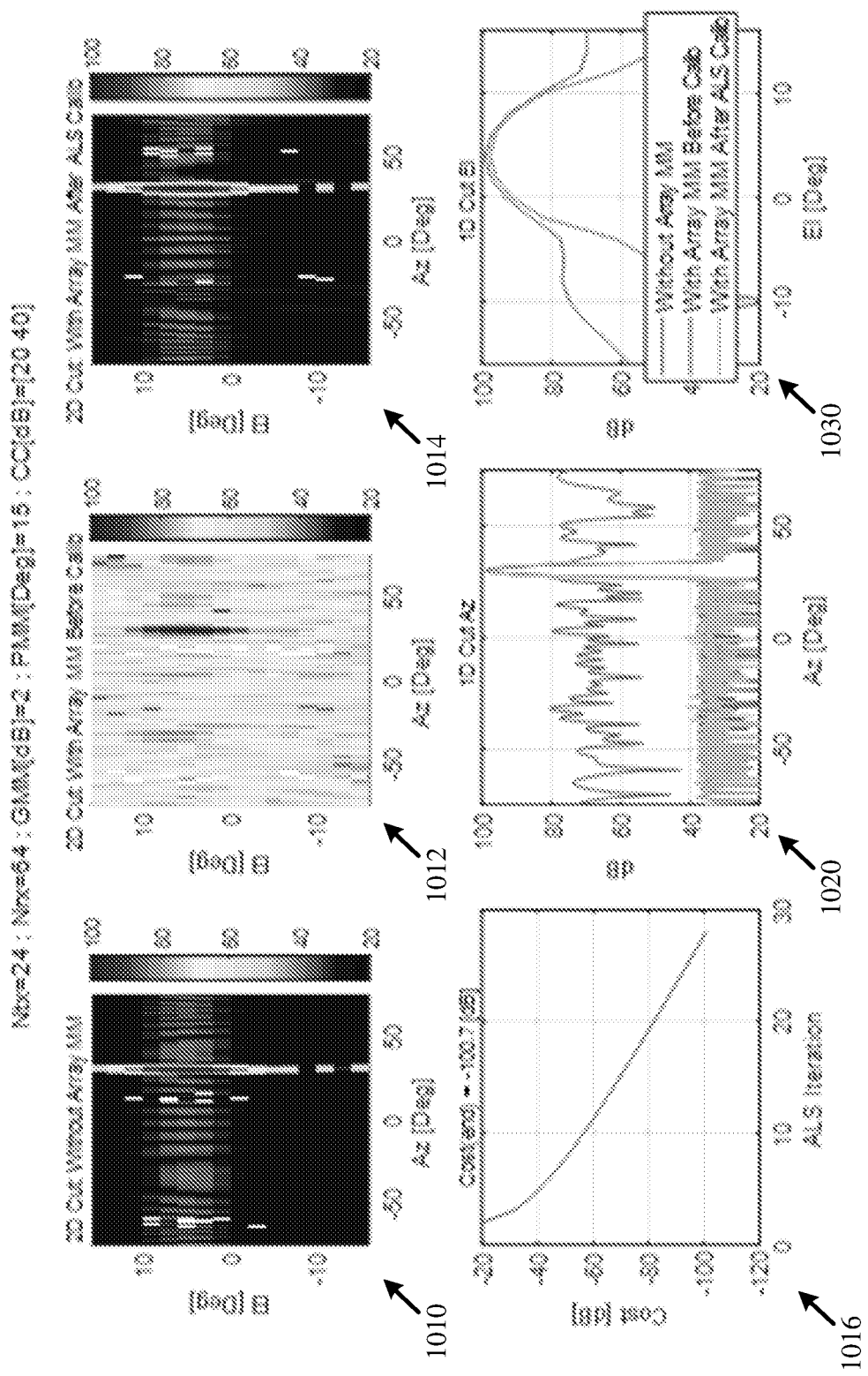
FIG. 10 is a schematic illustration of performance graphs of radar processing with antenna mismatch calibration, in accordance with some demonstrative aspects.

Reference is made to FIG. 10, which schematically illustrates performance graphs of radar processing with antenna mismatch calibration, in accordance with some demonstrative aspects.

In one example, the performance graphs of FIG. 10 may correspond to a MIMO radar antenna including 24 Tx antenna elements, and 64 Rx antenna elements, with respect to a target located at an azimuth of about 40 degrees and at an elevation of about 70 degrees.

As shown in FIG. 10, the target may be clearly identified on a two-dimensional (2D) azimuth-elevation map 1010, which may be generated based on measurements of Rx radar signals received by a MIMO antenna array not having an antenna MM.

As shown in FIG. 10, the target may not be identified on a 2D azimuth-elevation map 1012, which may be generated based on measurements of Rx radar signals received by a MIMO antenna array having an antenna MM, for example, if antenna MM calibration is not applied.

As shown in FIG. 10, the target may be clearly identified on a 2D azimuth-elevation map 1014, which may be generated based on measurements of Rx radar signals received by a MIMO antenna array having an antenna MM, for example, if antenna MM calibration is applied, e.g., according to the antenna MM calibration described above.

In some demonstrative aspects, as shown in FIG. 10, the 2D azimuth-elevation map 1014 generated utilizing the antenna MM calibration may provide similar results to the 2D azimuth-elevation map 1010 when there is no antenna MM.

In some demonstrative aspects, as shown in FIG. 10, a cost function 1016 may converge, for example, after less than 30 iterations of the ALS estimation method.

In some demonstrative aspects, as shown in FIG. 10, an azimuth AoA image 1026, which may be generated based on the Rx radar signals received by the MIMO antenna array with the antenna MM calibration, may provide similar results compared to an azimuth AoA image 1022, which may be based on the Rx radar signals received by the MIMO antenna array not having an antenna MM.

In some demonstrative aspects, as shown in FIG. 10, an elevation AoA image 1036, which may be generated based on the Rx radar signals received by the MIMO antenna array with the antenna MM calibration, may provide similar results compared to an elevation AoA image 1032, which may be based on the Rx radar signals received by the MIMO antenna array not having an antenna MM.

In some demonstrative aspects, as shown in FIG. 10, elevation AoA image 1026 and azimuth AoA image 1016 show that the antenna MM calibration may achieve a PSLL, which is better, for example, than 57 dB.

In some demonstrative aspects, calibrating an antenna array using boresight calibration may have one or more technical inefficiencies, disadvantages and/or problems in one or more use cases and/or scenarios. For example, while the boresight calibration may be implemented to calibrate only at one angle, which may be relatively simple, the boresight calibration may have a reduced Side Lobe Level (SLL) performance, e.g., of about ~15 dB.

In some demonstrative aspects, calibrating an antenna array using an empirical Maximum Likelihood (ML) based correction may have one or more technical inefficiencies, disadvantages and/or problems in one or more use cases and/or scenarios. For example, the empirical ML based correction may calibrate an antenna array, for example, by scanning an entire 2D AoA grid, which may be greater than a number of virtual elements, constructing an empirical steering matrix, e.g., an array manifold, and projecting the steering matrix on the received signal, e.g., after Range-Doppler (RD) processing. For example, while ML-based correction method may be suitable for maximizing an SNR, this method may not be suitable for minimizing the SLL, and accordingly, may not be suitable for achieving a suitable PSLL, e.g., a high PSLL.

Figures 11A, 11B:
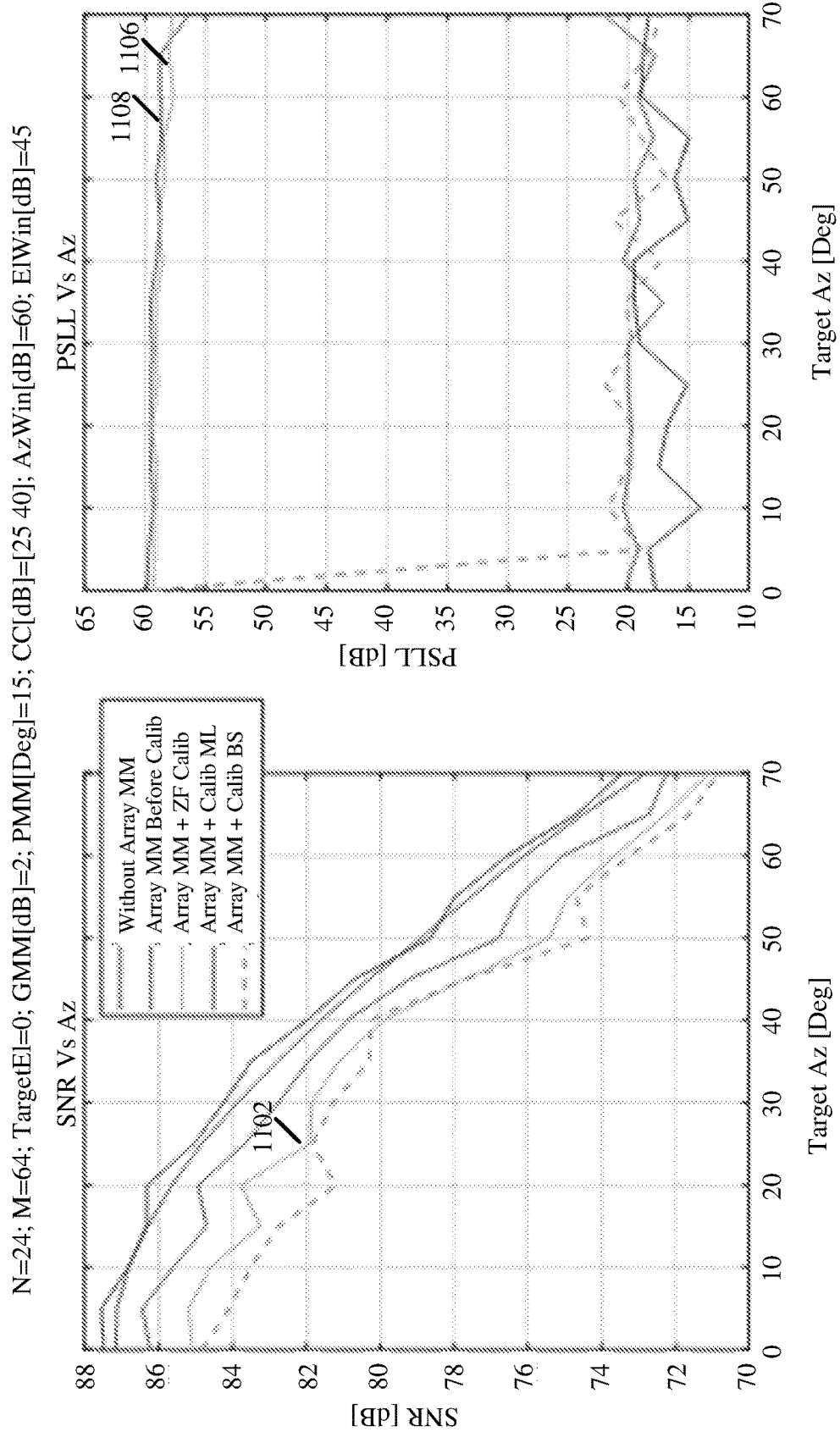
FIG. 11A is a schematic illustration of a graph depicting a signal to Noise Ratio (SNR) performance of radar processing with antenna mismatch calibration, in accordance with some demonstrative aspects.
FIG. 11B is a schematic illustration of a graph depicting a Peak Side Lobe Level (PSLL) performance of radar processing with antenna mismatch calibration, in accordance with some demonstrative aspects.

Reference is made to FIG. 11A, which schematically illustrates a graph 1110 depicting a signal to Noise Ratio (SNR) performance of radar processing with antenna mismatch calibration, and to FIG. 11B, which schematically illustrates a graph 1120 depicting a PSLL performance of radar processing with antenna mismatch calibration, in accordance with some demonstrative aspects.

In some demonstrative aspects, as shown in FIG. 1A, a curve 1102 represents an SNR based on Rx radar signals received by a MIMO antenna array with antenna MM calibration, e.g., as described above.

In some demonstrative aspects, as shown in FIG. 11A, the SNR performance curve 1102 of the MIMO antenna array with the antenna MM calibration, may be comparable to an SNR performance of other calibration algorithms.

In some demonstrative aspects, as shown in FIG. 11A, a curve 1106 represents a PSLL, which may be achieved based on processing the Rx radar signals received by the MIMO antenna array with the antenna MM calibration, e.g., as described above.

In some demonstrative aspects, as shown in FIG. 11B, the PSLL performance achieved by the antenna MM calibration may be comparable to a PSLL performance 1108 of an antenna array not having an antenna MM.

In some demonstrative aspects, as shown in FIGS. 11A and 11B, the antenna MM calibration may achieve a significantly improved PSLL, for example, while maintaining a suitable SNR, e.g., compared to other calibration algorithms.

Figures 12A, 12B:
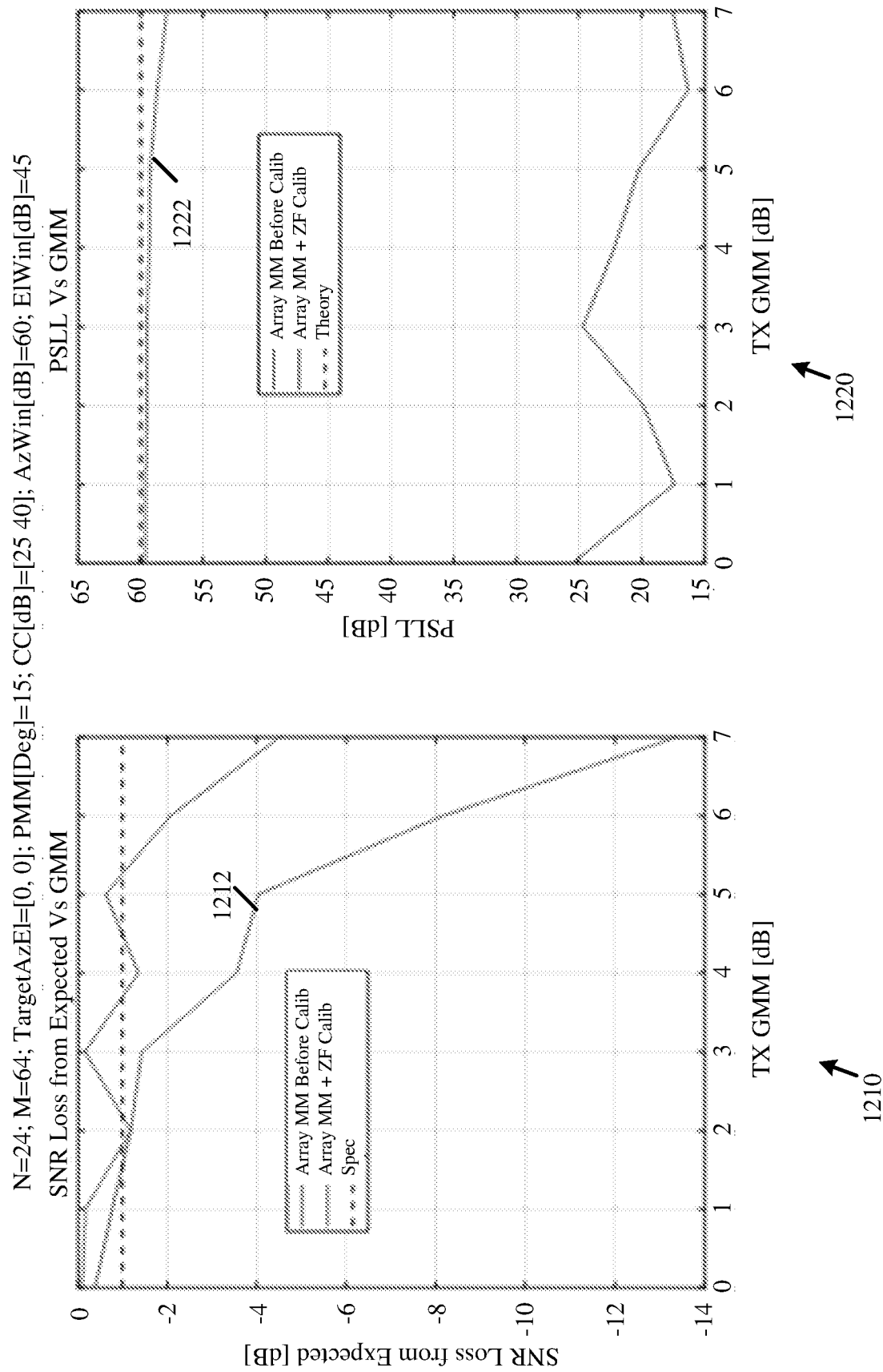
FIG. 12A is a schematic illustration of a graph depicting an SNR loss performance of radar processing with antenna mismatch calibration, in accordance with some demonstrative aspects.
FIG. 12B is a schematic illustration of a graph depicting a PSLL performance of radar processing with antenna mismatch calibration, in accordance with some demonstrative aspects.

Reference is made to FIG. 12A, which schematically illustrates a graph 1210 depicting an SNR loss performance of radar processing with antenna mismatch calibration, and to FIG. 12B, which schematically illustrates a graph 1220 depicting PSLL performance of radar processing with antenna mismatch calibration, in accordance with some demonstrative aspects.

In some demonstrative aspects, as shown in FIG. 12A, a curve 1212 represents an SNR loss of radar processing based on Rx radar signals received by a MIMO antenna array while applying the antenna MM calibration, e.g., as described above.

In some demonstrative aspects, as shown in FIG. 12B, a curve 1222 represents a PSLL achieved by radar processing based on Rx radar signals received by the MIMO antenna array while applying the antenna MM calibration, e.g., as described above.

In some demonstrative aspects, as shown in FIG. 12A, when a Tx GMM standard deviation is below 2 dB, which is the expected native GMM, the SNR loss of curve 1212 may be negligible, e.g., less than 1 dB.

In some demonstrative aspects, as shown in FIG. 12B, the PSLL performance of curve 1222 may be comparable to the PSLL performance of a theoretical array not having antenna MM, for example, while maintaining the SNR loss negligible, e.g., as shown in FIG. 12A.

Figure 13:
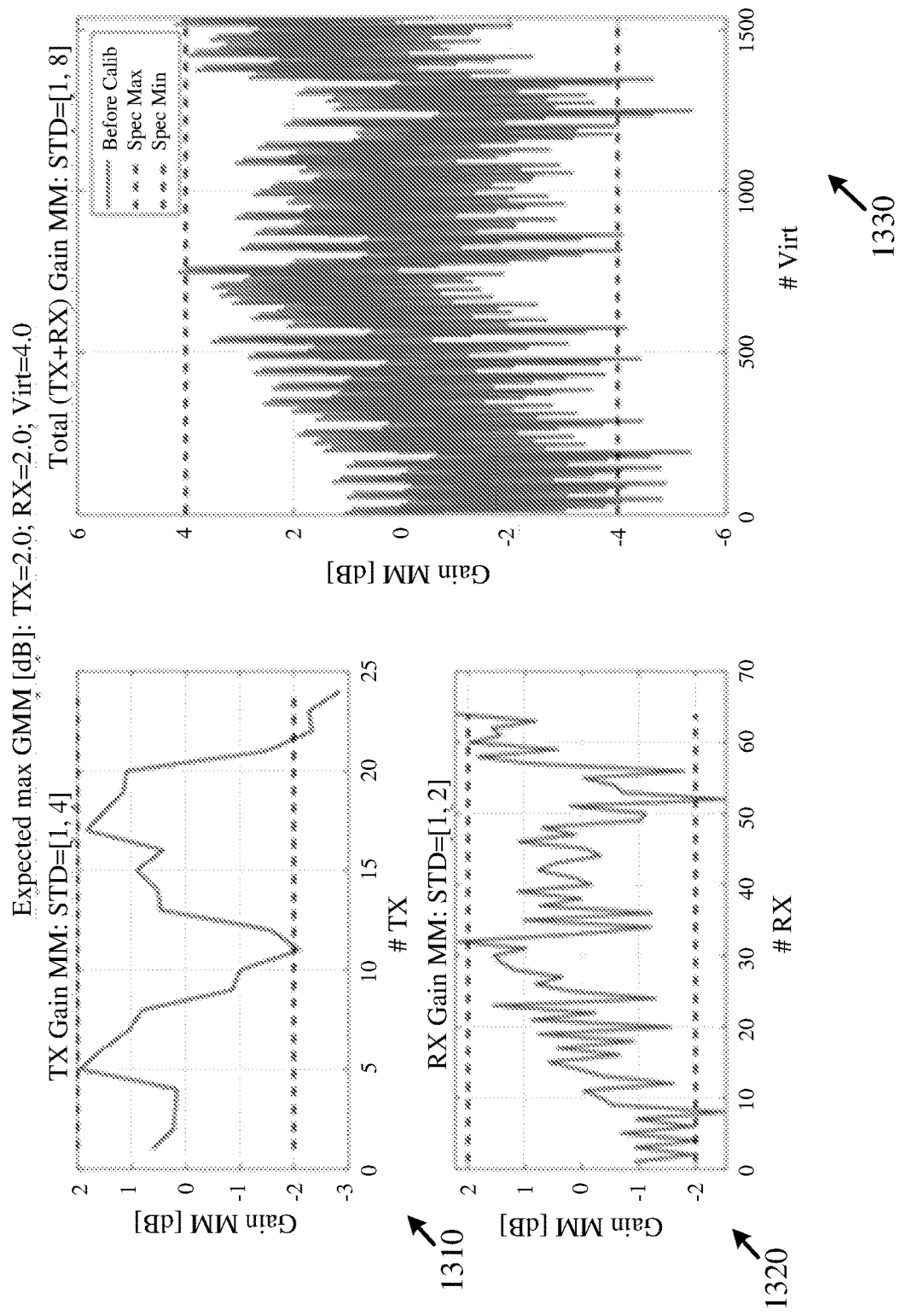
FIG. 13 is a schematic illustration of graphs depicting antenna gain mismatches, which may be used as a reference in accordance with some demonstrative aspects.

Reference is made to FIG. 13, which schematically illustrates graphs 1310, 1320 and 1330 depicting antenna gain mismatches, which may be used as a reference in accordance with some demonstrative aspects.

For example, the graphs 1310, 1320 and 1330 represent native Tx and Rx GMM, e.g., without any tuning.

As shown in FIG. 13, both Tx GMM and Rx GMM may have a standard deviation of less than 2 dB. Accordingly, the antenna MM calibration, e.g., as described above, may be implemented to improved PSLL performance, e.g., as shown by curve 1222 (FIG. 12B), for example, while maintaining very low SNR degradation, e.g., less than 1 dB, as shown by curve 1212 (FIG. 12A).

Figure 14:
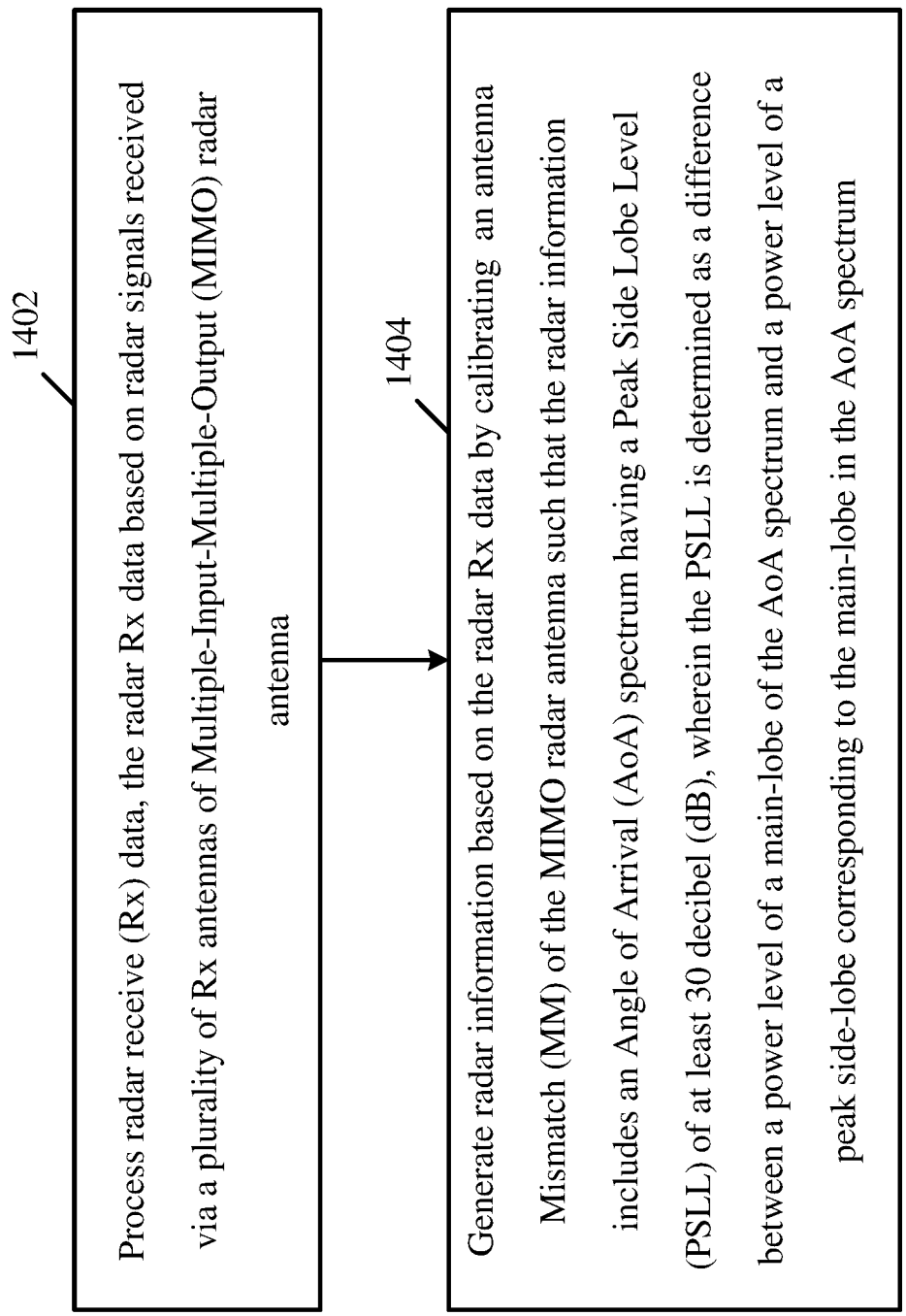
FIG. 14 is a schematic flow-chart illustration of a method of radar antenna calibration, in accordance with some demonstrative aspects.

Reference is made to FIG. 14, which schematically illustrates a method of radar antenna calibration, in accordance with some demonstrative aspects. For example, one or more of the operations of the method of FIG. 14 may be performed by one or more elements of a system, for example, one or more vehicles, e.g., vehicle 100 (FIG. 1), a radar device, e.g., radar device 101 (FIG. 1), a mismatch calibrator, e.g., mismatch calibrator 871 (FIG. 8), a radar processor, e.g., radar processor 836 (FIG. 8) and/or radar processor 834 (FIG. 8).

As indicated at block 1402, the method may include processing radar Rx data, which may be based on radar signals received via a plurality of Rx antennas of a MIMO radar antenna. For example, radar processor 834 (FIG. 8) may process the radar Rx data 811 (FIG. 8), e.g., as described above.

As indicated at block 1404, the method may include generating radar information based on the radar Rx data by calibrating an antenna MM of the MIMO radar antenna such that the radar information includes an AoA spectrum having a PSLL of at least 30 dB, for example, wherein the PSLL is determined as a difference between a power level of a main-lobe of the AoA spectrum and a power level of a peak side-lobe corresponding to the main-lobe in the AoA spectrum. For example, antenna MM calibrator 871 (FIG. 8) may calibrate the antenna MM of the MIMO radar antenna 881 (FIG. 8), e.g., as described above.

Figure 15:
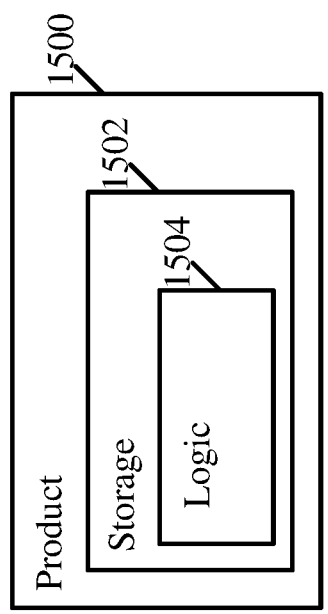
FIG. 15 is a schematic illustration of a product of manufacture, in accordance with some demonstrative aspects.

Reference is made to FIG. 15, which schematically illustrates a product of manufacture 1500, in accordance with some demonstrative aspects. Product 1500 may include one or more tangible computer-readable ("machine-readable") non-transitory storage media 1502, which may include computer-executable instructions, e.g., implemented by logic 1504, operable to, when executed by at least one computer processor, enable the at least one computer processor to implement one or more operations at a vehicle, e.g., vehicle 100 (FIG. 1), a radar device, e.g., radar device 101 (FIG. 1), a mismatch calibrator, e.g., mismatch calibrator 871 (FIG. 8), a radar processor, e.g., radar processor 836 (FIG. 8) and/or radar processor 834 (FIG. 8); to cause a vehicle, e.g., vehicle 100 (FIG. 1), a radar device, e.g., radar device 101 (FIG. 1), a mismatch calibrator, e.g., mismatch calibrator 871 (FIG. 8), a radar processor, e.g., radar processor 836 (FIG. 8) and/or radar processor 834 (FIG. 8), to perform, trigger and/or implement one or more operations and/or functionalities; and/or to perform, trigger and/or implement one or more operations and/or functionalities described with reference to the FIGS. 1-14, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1500 and/or storage media 1502 may include one or more types of computer-readable storage media capable of storing data, including volatile memory, non-volatile memory, removable or non-removable memory, erasable or non-erasable memory, writeable or re-writeable memory, and the like. For example, storage media 1502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1504 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further aspects.

Example 1 includes an apparatus comprising an input to receive radar receive (Rx) data, the radar Rx data based on radar signals received via a plurality of Rx antennas of a Multiple-Input-Multiple-Output (MIMO) radar antenna; and a radar processor configured to generate radar information based on the radar Rx data by calibrating an antenna Mismatch (MM) of the MIMO radar antenna such that the radar information includes an Angle of Arrival (AoA) spectrum having a Peak Side Lobe Level (PSLL) of at least 30 decibel (dB), wherein the PSLL is determined as a difference between a power level of a main-lobe of the AoA spectrum and a power level of a peak side-lobe corresponding to the main-lobe in the AoA spectrum.

Example 2 includes the subject matter of Example 1, and optionally, comprising a memory to store a first calibration matrix and a second calibration matrix, the radar processor configured to retrieve the first calibration matrix and the second calibration matrix from the memory, and to generate the radar information by calibrating the antenna MM of the MIMO radar antenna based on the first calibration matrix and the second calibration matrix.

Example 3 includes the subject matter of Example 2, and optionally, wherein the first calibration matrix comprises an Rx calibration matrix, and the second calibration matrix comprises a Transmit (Tx) calibration matrix, the Rx calibration matrix corresponding to an Rx MM of the plurality of Rx antennas, the Tx calibration matrix corresponding to a Tx MM of a plurality of Tx antennas of the MIMO radar antenna.

Example 4 includes the subject matter of Example 2 or 3, and optionally, wherein a size of the first calibration matrix is M*M, and a size of the second calibration matrix is N*N, wherein M denotes a count of the Rx antennas, and N denotes a count of the Tx antennas.

Example 5 includes the subject matter of any one of Examples 2-4, and optionally, wherein the radar processor is configured to update at least one of the first calibration matrix or the second calibration matrix based on a change in at least one parameter to affect the antenna MM of the MIMO radar antenna.

Example 6 includes the subject matter of any one of Examples 2-5, and optionally, wherein the radar processor is configured to, e.g., dynamically, update at least one of the first calibration matrix or the second calibration matrix, e.g., in real-time, based on a detected change in at least one parameter to affect the antenna MM of the MIMO radar antenna.

Example 7 includes the subject matter of any one of Examples 1-6, and optionally, wherein the radar processor is configured to generate intermediate radar data based on the radar Rx data, the radar processor comprising an antenna MM calibrator configured to generate calibrated intermediate radar information by applying an antenna MM calibration to the intermediate radar data, the radar processor configured to generate the radar information based on the calibrated intermediate radar information.

Example 8 includes the subject matter of Example 7, and optionally, wherein the intermediate radar information comprises intermediate range-Doppler information based on the radar Rx data.

Example 9 includes the subject matter of Example 7 or 8, and optionally, wherein the radar processor is configured to generate Cross-Correlation (XCORR) information based on the radar Rx data, and to generate the intermediate radar data by applying a Fast Fourier Transform (FFT) to the XCORR information.

Example 10 includes the subject matter of any one of Examples 7-9, and optionally, comprising a memory to store a first calibration matrix and a second calibration matrix, the antenna MM calibrator configured to retrieve the first calibration matrix and the second calibration matrix from the memory, and to generate the calibrated intermediate radar information by applying the first calibration matrix and the second calibration matrix to the intermediate radar information.

Example 11 includes the subject matter of Example 10, and optionally, wherein the antenna MM calibrator is configured to determine a product of the first calibration matrix multiplied by the intermediate radar information, and to determine the calibrated intermediate radar information by multiplying by the second calibration matrix the product of the first calibration matrix and the intermediate radar information.

Example 12 includes the subject matter of Example 10 or 11, and optionally, wherein the first calibration matrix comprises an Rx calibration matrix, and the second calibration matrix comprises a Transmit (Tx) calibration matrix, the Rx calibration matrix corresponding to an Rx MM of the plurality of Rx antennas, the Tx calibration matrix corresponding to a Tx MM of a plurality of Tx antennas of the MIMO radar antenna.

Example 13 includes the subject matter of any one of Examples 10-12, and optionally, wherein a size of the first calibration matrix is M*M, and a size of the second calibration matrix is N*N, wherein M denotes a count of the Rx antennas, and N denotes a count of the Tx antennas.

Example 14 includes the subject matter of any one of Examples 1-13, and optionally, wherein the radar processor is configured to generate the radar information by calibrating the antenna MM of the MIMO radar antenna to provide the radar information including the AoA spectrum having a PSLL of at least 40 dB.

Example 15 includes the subject matter of any one of Examples 1-14, and optionally, wherein the radar processor is configured to generate the radar information by calibrating the antenna MM of the MIMO radar antenna to provide the radar information including the AoA spectrum having a PSLL of at least 50 dB.

Example 16 includes the subject matter of any one of Examples 1-15, and optionally, wherein the radar processor is configured to generate the radar information by calibrating the antenna MM of the MIMO radar antenna to provide the radar information including the AoA spectrum having a PSLL of at least 55 dB.

Example 17 includes the subject matter of any one of Examples 1-16, and optionally, wherein the radar processor is configured to generate the radar information by calibrating the antenna MM of the MIMO radar antenna to provide the radar information including the AoA spectrum having a PSLL of at least 60 dB.

Example 18 includes the subject matter of any one of Examples 1-17, and optionally, comprising the MIMO radar antenna, a plurality of Transmit (Tx) chains to transmit a plurality of Tx signals via a plurality of Tx antennas of the MIMO radar antenna, and a plurality of Rx chains to generate the radar Rx data based on the radar signals received via the plurality of Rx antennas.

Example 19 includes the subject matter of any one of Examples 1-18, and optionally, comprising a vehicle, the vehicle comprising a system controller configured to control one or more vehicular systems of the vehicle based on the radar information.

Example 20 includes an apparatus comprising means for executing any of the described operations of Examples 1-19.

Example 21 includes a machine-readable medium that stores instructions for execution by a processor to perform any of the described operations of Examples 1-19.

Example 22 includes an apparatus comprising a memory; and processing circuitry configured to perform any of the described operations of Examples 1-19.

Example 23 includes a method including any of the described operations of Examples 1-19.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   an input to receive radar receive (Rx) data, the radar Rx data based on radar signals received via a plurality of Rx antennas of a Multiple-Input-Multiple-Output (MIMO) radar antenna;
   a memory to store a first calibration matrix and a second calibration matrix; and
   a radar processor configured to generate radar information based on the radar Rx data by calibrating an antenna Mismatch (MM) of the MIMO radar antenna such that the radar information includes an Angle of Arrival (AoA) spectrum having a Peak Side Lobe Level (PSLL) of at least 30 decibel (dB), wherein the PSLL is determined as a difference between a power level of a main-lobe of the AoA spectrum and a power level of a peak side-lobe corresponding to the main-lobe in the AoA spectrum, wherein the radar processor is configured to retrieve the first calibration matrix and the second calibration matrix from the memory, and to generate the radar information by calibrating the antenna MM of the MIMO radar antenna based on the first calibration matrix and the second calibration matrix, wherein the radar processor is configured to update at least one of the first calibration matrix or the second calibration matrix based on a detected change in at least one parameter to affect the antenna MM of the MIMO radar antenna.

2. The apparatus of claim 1, wherein the first calibration matrix comprises an Rx calibration matrix, and the second calibration matrix comprises a Transmit (Tx) calibration matrix, the Rx calibration matrix corresponding to an Rx MM of the plurality of Rx antennas, the Tx calibration matrix corresponding to a Tx MM of a plurality of Tx antennas of the MIMO radar antenna.

3. The apparatus of claim 2, wherein a size of the first calibration matrix is M*M, and a size of the second calibration matrix is N*N, wherein M denotes a count of the Rx antennas, and N denotes a count of the Tx antennas.

4. The apparatus of claim 1, wherein the radar processor is configured to update, in real time, at least one of the first calibration matrix or the second calibration matrix based on a detected real-time change in the at least one parameter to affect the antenna MM of the MIMO radar antenna.

5. The apparatus of claim 1, wherein the radar processor is configured to generate intermediate radar data based on the radar Rx data, the radar processor comprising an antenna MM calibrator configured to generate calibrated intermediate radar information by applying an antenna MM calibration to the intermediate radar data, the radar processor configured to generate the radar information based on the calibrated intermediate radar information.

6. The apparatus of claim 5, wherein the intermediate radar data comprises intermediate range-Doppler information based on the radar Rx data.

7. The apparatus of claim 5, wherein the radar processor is configured to generate Cross-Correlation (XCORR) information based on the radar Rx data, and to generate the intermediate radar data by applying a Fast Fourier Transform (FFT) to the XCORR information.

8. The apparatus of claim 5, wherein the antenna MM calibrator is configured to generate the calibrated intermediate radar information by applying the first calibration matrix and the second calibration matrix to the intermediate radar data.

9. The apparatus of claim 8, wherein the first calibration matrix comprises an Rx calibration matrix, and the second calibration matrix comprises a Transmit (Tx) calibration matrix, the Rx calibration matrix corresponding to an Rx MM of the plurality of Rx antennas, the Tx calibration matrix corresponding to a Tx MM of a plurality of Tx antennas of the MIMO radar antenna.

10. The apparatus of claim 9, wherein a size of the first calibration matrix is M*M, and a size of the second calibration matrix is N*N, wherein M denotes a count of the Rx antennas, and N denotes a count of the Tx antennas.

11. The apparatus of claim 5, wherein the antenna MM calibrator is configured to determine a product of the first calibration matrix multiplied by the intermediate radar data, and to determine the calibrated intermediate radar information by multiplying by the second calibration matrix the product of the first calibration matrix and the intermediate radar data.

12. The apparatus of claim 1, wherein the radar processor is configured to generate the radar information by calibrating the antenna MM of the MIMO radar antenna to provide the radar information including the AoA spectrum having the PSLL of at least 40 dB.

13. The apparatus of claim 1, wherein the radar processor is configured to generate the radar information by calibrating the antenna MM of the MIMO radar antenna to provide the radar information including the AoA spectrum having the PSLL of at least 55 dB.

14. The apparatus of claim 1, wherein the radar processor is configured to generate the radar information by calibrating the antenna MM of the MIMO radar antenna to provide the radar information including the AoA spectrum having the PSLL of at least 60 dB.

15. The apparatus of claim 1 comprising the MIMO radar antenna, a plurality of Transmit (Tx) chains to transmit a plurality of Tx signals via a plurality of Tx antennas of the MIMO radar antenna, and a plurality of Rx chains to generate the radar Rx data based on the radar signals received via the plurality of Rx antennas.

16. A product comprising one or more tangible computer-readable non-transitory storage media comprising instructions operable to, when executed by at least one processor, enable the at least one processor to cause a radar device to:
process radar receive (Rx) data, the radar Rx data based on radar signals received via a plurality of Rx antennas of a Multiple-Input-Multiple-Output (MIMO) radar antenna; and
generate radar information based on the radar Rx data by calibrating an antenna Mismatch (MM) of the MIMO radar antenna such that the radar information includes an Angle of Arrival (AoA) spectrum having a Peak Side Lobe Level (PSLL) of at least 30 decibel (dB), wherein the PSLL is determined as a difference between a power level of a main-lobe of the AoA spectrum and a power level of a peak side-lobe corresponding to the main-lobe in the AoA spectrum,
wherein the instructions, when executed, cause the radar device to store in a memory a first calibration matrix and a second calibration matrix, to retrieve the first calibration matrix and the second calibration matrix from the memory, and to generate the radar information by calibrating the antenna MM of the MIMO radar antenna based on the first calibration matrix and the second calibration matrix,
wherein the instructions, when executed, cause the radar device to update at least one of the first calibration matrix or the second calibration matrix based on a detected change in at least one parameter to affect the antenna MM of the MIMO radar antenna.

17. The product of claim 16, wherein the instructions, when executed, cause the radar device to update, in real time, at least one of the first calibration matrix or the second calibration matrix based on a detected real-time change in the at least one parameter to affect the antenna MM of the MIMO radar antenna.

18. The product of claim 16, wherein the first calibration matrix comprises an Rx calibration matrix, and the second calibration matrix comprises a Transmit (Tx) calibration matrix, the Rx calibration matrix corresponding to an Rx MM of the plurality of Rx antennas, the Tx calibration matrix corresponding to a Tx MM of a plurality of Tx antennas of the MIMO radar antenna.

19. The product of claim 16, wherein the instructions, when executed, cause the radar device to generate intermediate radar data based on the radar Rx data, to generate calibrated intermediate radar information by applying an antenna MM calibration to the intermediate radar data, and to generate the radar information based on the calibrated intermediate radar information.

20. A vehicle comprising:
a system controller configured to control one or more vehicular systems of the vehicle based on radar information; and
a radar device configured to provide the radar information to the system controller, the radar device comprising:
  a Multiple-Input-Multiple-Output (MIMO) radar antenna comprising a plurality of Transmit (Tx) antennas to transmit Tx radar signals, and a plurality of Receive (Rx) antennas to receive Rx radar signals based on the Tx radar signals;
  a memory to store a first calibration matrix and a second calibration matrix; and
  a radar processor configured to generate the radar information based on radar Rx data, the radar Rx data based on the Rx radar signals, wherein the radar processor is configured to generate the radar information by calibrating an antenna Mismatch (MM) of the MIMO radar antenna such that the radar information includes an Angle of Arrival (AoA) spectrum having a Peak Side Lobe Level (PSLL) of at least 30 decibel (dB), wherein the PSLL is determined as a difference between a power level of a main-lobe of the AoA spectrum and a power level of a peak side-lobe corresponding to the main-lobe in the AoA spectrum, wherein the radar processor is configured to retrieve the first calibration matrix and the second calibration matrix from the memory, and to generate the radar information by calibrating the antenna MM of the MIMO radar antenna based on the first calibration matrix and the second calibration matrix, wherein the radar processor is configured to update at least one of the first calibration matrix or the second calibration matrix based on a detected change in at least one parameter to affect the antenna MM of the MIMO radar antenna.

21. The vehicle of claim 20, wherein the radar processor is configured to generate intermediate radar data based on the radar Rx data, the radar processor comprising an antenna MM calibrator configured to generate calibrated intermediate radar information by applying an antenna MM calibration to the intermediate radar data, the radar processor configured to generate the radar information based on the calibrated intermediate radar information.

22. The vehicle of claim 20, wherein the first calibration matrix comprises an Rx calibration matrix, and the second calibration matrix comprises a Tx calibration matrix, the Rx calibration matrix corresponding to an Rx MM of the plurality of Rx antennas, the Tx calibration matrix corresponding to a Tx MM of the plurality of Tx antennas of the MIMO radar antenna.

* * * * *